(12) United States Patent
Shirakata et al.

(10) Patent No.: US 8,255,533 B2
(45) Date of Patent: Aug. 28, 2012

(54) WIRELESS COMMUNICATION SYSTEM, COMMUNICATION TERMINAL, MANAGEMENT TERMINAL, COMMUNICATION METHOD, AND INTEGRATED CIRCUIT

(75) Inventors: Naganori Shirakata, Osaka (JP); Yoshitaka Ohta, Osaka (JP); Hiroshi Doi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/675,245

(22) PCT Filed: Jun. 25, 2009

(86) PCT No.: PCT/JP2009/002927
§ 371 (c)(1),
(2), (4) Date: Feb. 25, 2010

(87) PCT Pub. No.: WO2010/001557
PCT Pub. Date: Jan. 7, 2010

(65) Prior Publication Data
US 2011/0093593 A1    Apr. 21, 2011

(30) Foreign Application Priority Data
Jun. 30, 2008    (JP) .................................. 2008-171817

(51) Int. Cl.
*G06F 15/173* (2006.01)
*H04L 12/26* (2006.01)

(52) U.S. Cl. ........ 709/225; 709/223; 709/224; 370/228; 370/229

(58) Field of Classification Search .................. 709/223, 709/224, 225; 370/228, 229
See application file for complete search history.

(56) References Cited

U.S. PATENT DOCUMENTS

| | | | |
|---|---|---|---|
| 6,975,614 B2 | 12/2005 | Kennedy | |
| 7,230,940 B2* | 6/2007 | Fantaske | 370/338 |
| 7,308,259 B2* | 12/2007 | Madsen | 455/434 |
| 7,366,511 B2* | 4/2008 | Jaakkola et al. | 455/435.2 |
| 7,596,368 B2* | 9/2009 | Yamada et al. | 455/411 |
| 7,623,873 B2* | 11/2009 | Satrusajang et al. | 455/456.1 |
| 2002/0128030 A1* | 9/2002 | Eiden et al. | 455/519 |

(Continued)

FOREIGN PATENT DOCUMENTS
JP    2004-173162    6/2004
(Continued)

OTHER PUBLICATIONS
International Search Report issued Jul. 21, 2009 in corresponding International Application No. PCT/JP2009/002927.

*Primary Examiner* — Asghar Bilgrami
(74) *Attorney, Agent, or Firm* — Wenderoth, Lind & Ponack, L.L.P.

(57) ABSTRACT

A beacon is transmitted and received among a plurality of terminals STA. A terminal STA which transmits the beacon is assigned as a representative terminal MSTA which manages a group, and a terminal STA which receives the beacon is assigned as a belonging terminal SSTA of the group. The representative terminal MSTA obtains identification information from the belonging terminal SSTA and stores the identification information. Then, when receiving an AP beacon from a management terminal AP, the representative terminal MSTA collectively transmits, to the management terminal AP, the identification information of the representative terminal MSTA and the belonging terminal SSTA. The management terminal AP performs an authentication procedure, by using the collectively transmitted identification information, for each of all of the communication terminals which form the group.

8 Claims, 21 Drawing Sheets

U.S. PATENT DOCUMENTS

| | | | |
|---|---|---|---|
| 2003/0108019 A1* | 6/2003 | Takatori et al. | 370/338 |
| 2003/0236082 A1* | 12/2003 | Aoki et al. | 455/278.1 |
| 2004/0131025 A1* | 7/2004 | Dohler et al. | 370/328 |
| 2004/0152464 A1 | 8/2004 | Sugaya | |
| 2005/0195781 A1 | 9/2005 | Ikeda | |
| 2005/0233776 A1 | 10/2005 | Allen et al. | |
| 2006/0064589 A1* | 3/2006 | Taniguchi et al. | 713/170 |
| 2006/0079229 A1* | 4/2006 | Satrusajang et al. | 455/433 |
| 2009/0092101 A1* | 4/2009 | Busch et al. | 370/332 |

FOREIGN PATENT DOCUMENTS

| | | |
|---|---|---|
| JP | 2004-228926 | 8/2004 |
| JP | 2005-182145 | 7/2005 |
| JP | 2007-166000 | 6/2007 |

\* cited by examiner

F I G. 1 1 A
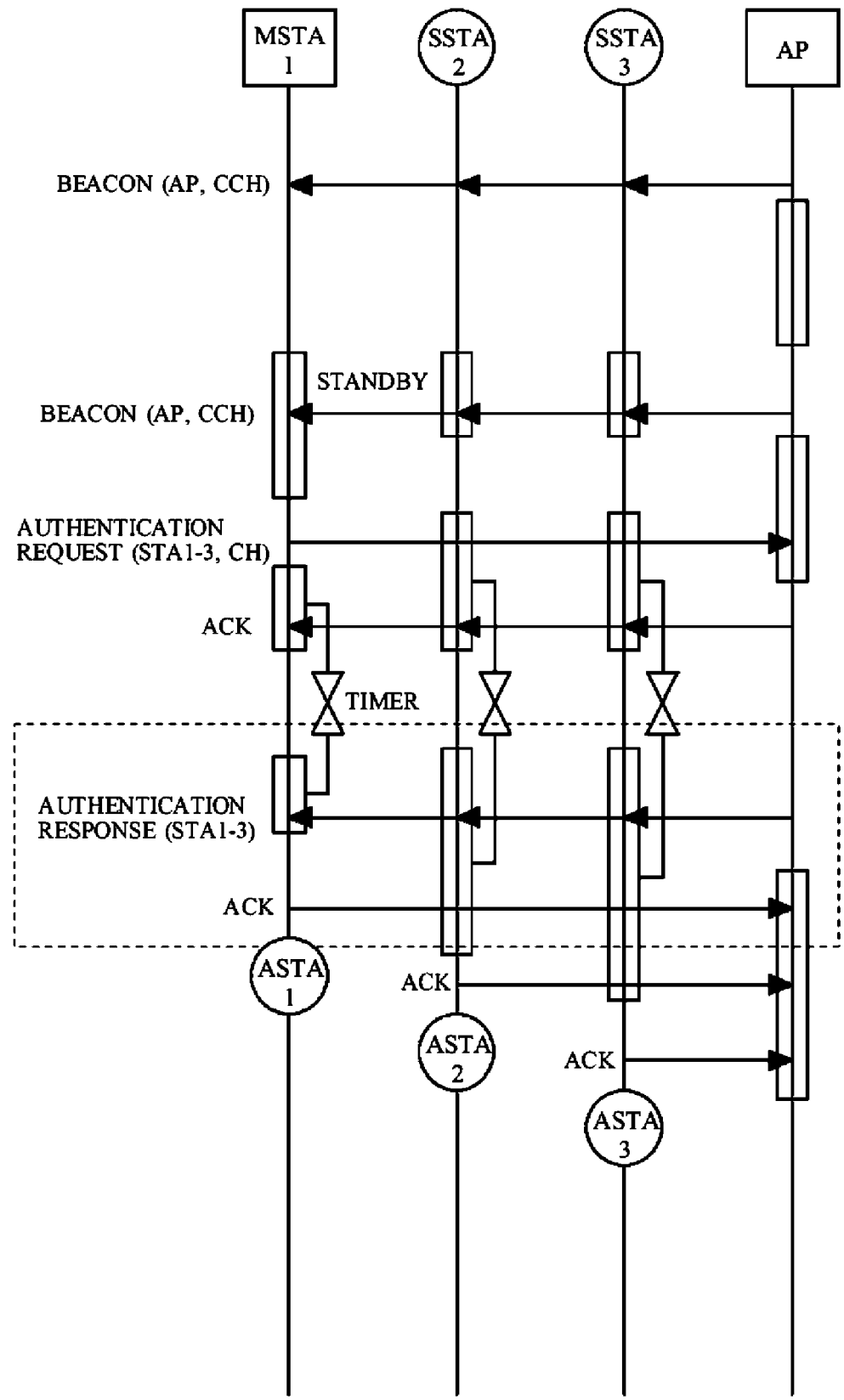

F I G. 1 2 A
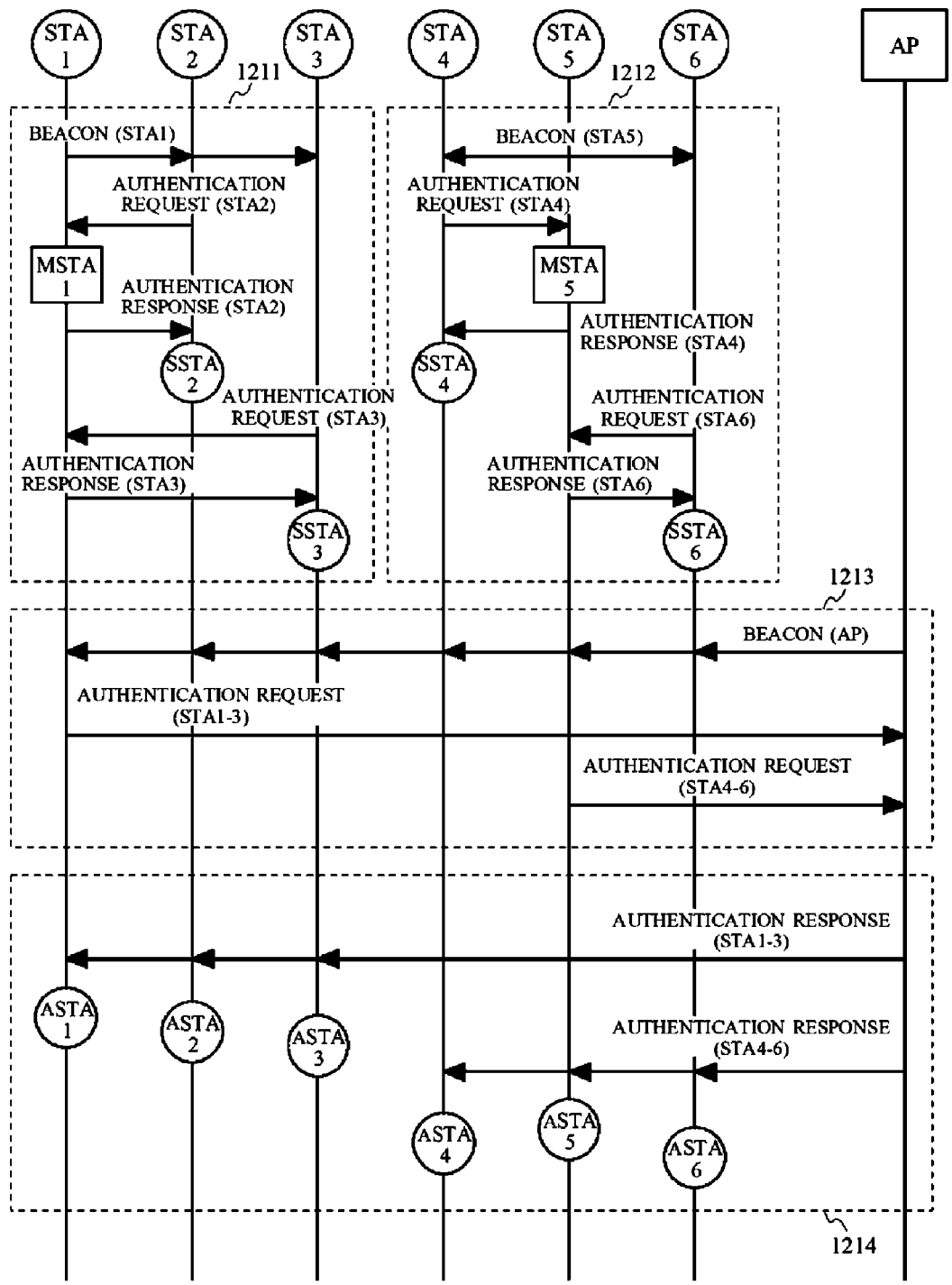

F I G. 1 7 A  PRIOR ART
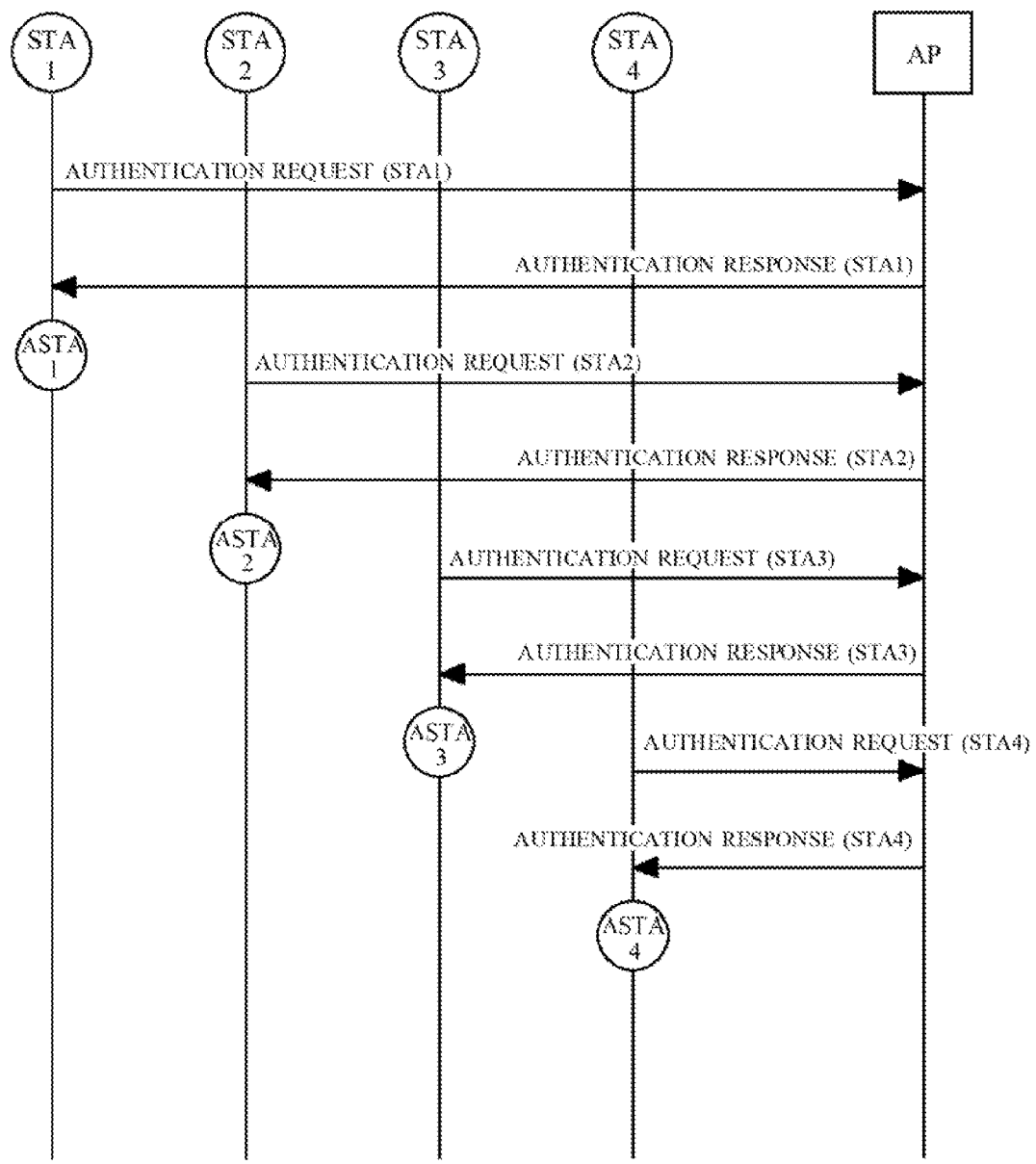

WIRELESS COMMUNICATION SYSTEM, COMMUNICATION TERMINAL, MANAGEMENT TERMINAL, COMMUNICATION METHOD, AND INTEGRATED CIRCUIT

TECHNICAL FIELD

The present invention relates to a wireless communication system which uses a sensor network or a wireless network containing a large number of terminals such as active RF tags and the like, to a communication terminal and a management terminal which form the wireless communication system, to a communication method executed by the wireless communication system, and to an integrated circuit which integrates functions of the communication terminal or functions of the management terminal.

BACKGROUND ART

In recent years, network systems, such as WPAN (Wireless Personal Area Network), a sensor network and the like, which use compact and low-power-consumption wireless communication terminals are attracting attention. As another similar system, there is a network system that uses, as wireless communication terminals, active RF tags which emit radio signals by themselves.

These network systems are capable of unifying the management of a large number of wireless communication terminals, so that applications in various fields are expected. For example, in such an application it is expected that wireless communication terminals are attached to respective goods, so that identification, tracking, management, and the like of the goods delivered to a communication area of a management terminal are wirelessly performed. Further, in such an application it is expected that wireless communication terminals are given to schoolchildren, whereby the schoolchildren are wirelessly monitored on their way between school and home by a management terminal installed at a school gate or the like (FIG. 15).

FIG. 15 illustrates an exemplary configuration of a conventional wireless communication system 1500 in which each of a plurality of communication terminals 1520 is authenticated by passing through a communication area of a management terminal (AP) 1510. When an unauthenticated communication terminal 1520 (hereinafter referred to as a terminal STA) enters the AP communication area, the management terminal 1510 detects the terminal STA. The detected terminal STA transmits its own identification information and an authentication request to the management terminal 1510. When determining that the terminal STA can be authenticated, the management terminal 1510 transmits an authentication response to the terminal STA and completes the authentication. The terminal STA for which the authentication has been completed becomes an authenticated terminal ASTA.

FIG. 16 illustrates, for example, an exemplary authentication sequence under IEEE802.15.4 which is a standard for WPAN. In FIG. 16, the communication terminal 1520 transmits an authentication request to the management terminal 1510. When successfully receiving the authentication request, the management terminal 1510 transmits an Ack (Acknowledge; reception acknowledgement) to the communication terminal 1520 and starts authentication processing. When receiving the Ack, the communication terminal 1520 stands by a predetermined time period necessary for the authentication processing. After standing by for the predetermined time period, the communication terminal 1520 transmits a data request to the management terminal 1510. When determining that the communication terminal 1520 can be authenticated, the management terminal 1510 transmits an authentication response to the communication terminal 1520. The communication terminal 1520 transmits, to the management terminal 1510, an Ack for the authentication response. At the time when the Ack for the authentication response is successfully received by the management terminal 1510, the authentication is completed.

The wireless communication terminals used in these networks generally have a low transmission rate (several kbps to several hundred kbps) and a short radio signal transmission range (about several meters to several tens of meters) whereby the communication area of the management terminal 1510 is small. That is, the management terminal 1510 has limited time to spare for each of the moving communication terminals 1520. Accordingly, when a plurality of communication terminals 1520 enter the communication area, a collision between authentication requests, timeout in authentication processing or the like occurs.

For example, FIG. 17A illustrates a state where no problem occurs because a small number of communication terminals 1520 enter the communication area of the management terminal 1510. On the other hand, FIG. 17B illustrates a state where a problem occurs because a large number of communication terminals 1520 enter the communication area of the management terminal 1510. As illustrated in FIG. 17B, when there are a large number of communication terminals 1520, authentication takes a long time to be completed, or authentication fails.

A method is disclosed, as a countermeasure against the above-described collision between the authentication requests, timeout in the authentication processing or the like, in a Patent Literature 1 in which authentication processing is distributed by using a plurality of management terminals.

Citation List

[Patent Literature]

[PTL 1] Japanese Laid-Open Patent Publication No. 2007-166000

SUMMARY OF INVENTION

Technical Problem

However, even if the number of the management terminals is increased as in the above-described Patent Literature 1, one-to-one authentication between a management terminal and a communication terminal is necessary in order to authenticate the communication terminals entering each of the communication areas which are respectively administrated by the management terminals. Accordingly, a fundamental problem in the case where a large number of communication terminals enter one communication area is not solved yet even though the method described in Patent Literature 1 is used.

Therefore, an object of the present invention is to provide a wireless communication system, a communication terminal, a management terminal, a communication method, and an integrated circuit, which are capable of authenticating more communication terminals even in such a case where a large number of communication terminals pass through a communication area of the management terminal in a short time.

Solution to Problem

The present invention is directed to a wireless communication system including a plurality of communication terminals and a management terminal which manages the plurality of communication terminals. In order to achieve the above-described object, in the wireless communication system of the present invention, at least one communication terminal of the plurality of communication terminals includes: a first transmission section for transmitting a first beacon; a first reception section for receiving a response which is transmitted from another communication terminal having received the first beacon, the response including the identification information; a storage section, in which said another communication terminal is registered as a terminal which belongs to a group where the at least one communication terminal serves as a representative, for storing the identification information of said another communication terminal; a second reception section for receiving a second beacon from the management terminal; and a second transmission section for collectively transmitting together with an authentication request, to the management terminal, in response to reception of the second beacon, identification information of the at least one communication terminal and the identification information, which is stored in the storage section, of a belonging terminal; and the management terminal includes: a transmission section for transmitting the second beacon; a reception section for collectively receiving, the identification information from the communication terminal which serves as the representative of the group; and a control section for performing an authentication procedure for each of all of the communication terminals which form the group, by using the identification information.

The transmission section of the management terminal is capable of transmitting the second beacon which includes information specifying a frequency channel used for a response. Further, the control section of the management terminal is capable of performing the authentication procedure by using a frequency channel different from the frequency channel used for the response.

Here, the communication terminals which belongs to the group may transmit packets without preambles such that the packets are continuously transmitted following a response transmitted from the communication terminal which serves as the representative of the group, so as to allow the response transmitted from the group to the management terminal is recognized as one packet.

Still further, the wireless communication system may further include an auxiliary management terminal for transmitting a third beacon to the plurality of communication terminals before the plurality of communication terminals forms the group, for receiving an authentication request transmitted from a communication terminal which has received the third beacon, and for assigning said communication terminal, in response to the authentication request, as either a communication terminal which serves as the representative of the group, or a communication terminal which belongs to the group.

Processes conducted by the communication terminal and the management terminal of the above-described wireless communication system may be viewed as a communication method that provides a series of process steps. This method is provided in the form of a program which causes a computer to execute the series of process steps. The program stored in a computer readable storage medium may be introduced to the computer. Furthermore, all or part of functional blocks included in the above-described transmission-and-reception apparatus may be realized as an LSI which is an integrated circuit.

Advantageous Effects of Invention

According to the present invention, a communication traffic volume between the plurality of communication terminals and the management terminal can be considerably reduced. Consequently, a collision rate in communication from the plurality of communication terminals to the management terminal is reduced whereby a load of the authentication processing which is performed by the management terminal can be reduced. Further, by using an auxiliary management terminal, the number of communication terminals which are unable to form a group can be minimized. Accordingly, the load of the authentication processing which is performed by the management terminal can be further reduced.

BRIEF DESCRIPTION OF DRAWINGS

FIG. 11A is a sequence diagram illustrating an example of group authentication processing.

FIG. 12A is a processing sequence diagram of a whole wireless communication system.

FIG. 17A is a diagram for illustrating a problem in a conventional wireless communication system.

DESCRIPTION OF EMBODIMENTS

≻First Embodiment≦

Figure 1:
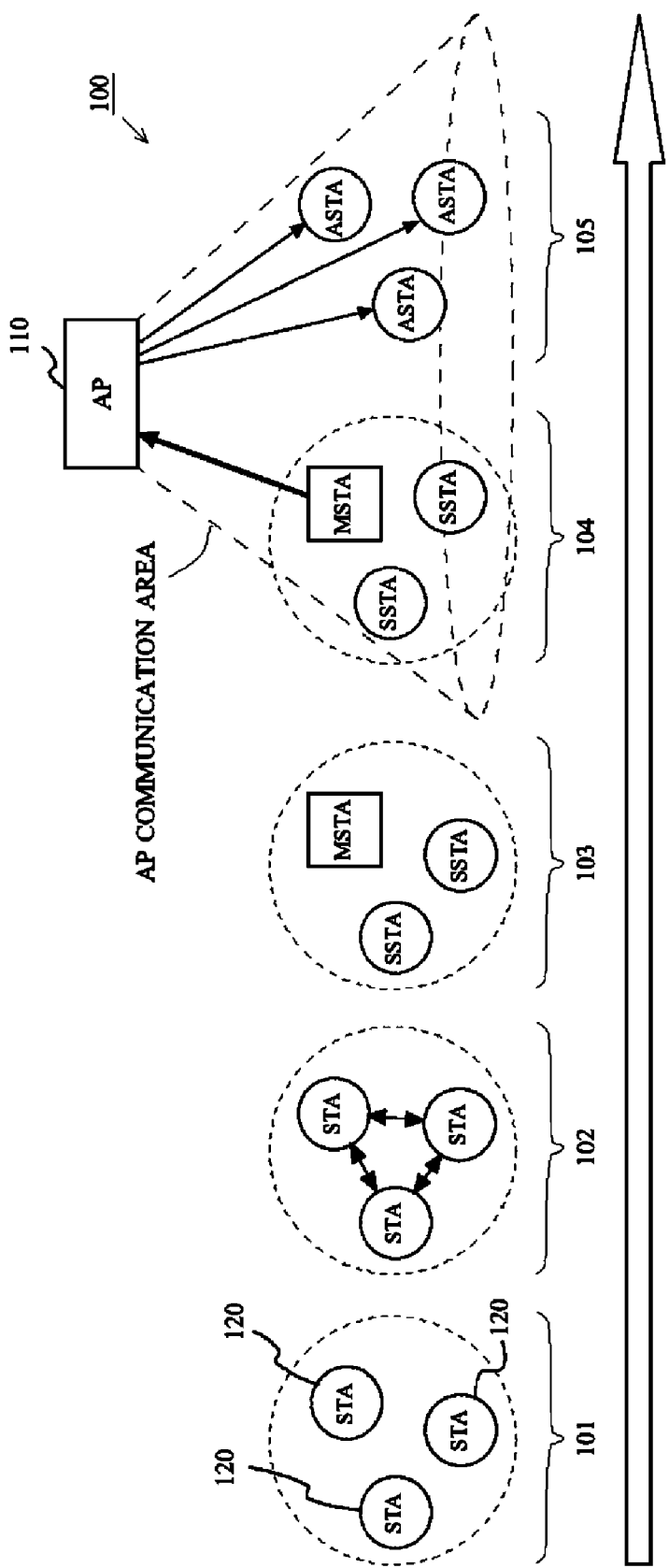
FIG. 1 is a diagram illustrating an exemplary configuration of a wireless communication system 100 according to a first embodiment of the present invention.

FIG. 1 is a diagram illustrating an exemplary configuration of a wireless communication system 100 according to a first embodiment of the present invention. The wireless communication system 100 according to the first embodiment includes a management terminal (AP) 110 and a plurality of communication terminals 120. Specific application examples of the wireless communication system 100 are, as described in Background Art, the goods management system, the management system for monitoring schoolchildren on their way between school and home, and the like. FIG. 1 illustrates, with key periods 101-105, that three of the communication terminals 120 move in a direction indicated by an arrow, and respective states of the three communication terminals 120 change as time advances.

A feature of the present invention is that the plurality of communication terminals 120 form a network-connected group by the time each of the plurality of communication terminals 120 changes from an unauthenticated communication terminal (terminal STA) to an authenticated communication terminal (authenticated terminal ASTA), and each of the plurality of communication terminals 120 changes to either a communication terminal (hereinafter referred to as a representative terminal MSTA) which functions as a master in the group, or a communication terminal (hereinafter referred to as a belonging terminal SSTA) which functions as a slave in the group.

(1) Outline

Prior to the detailed description of authentication processing performed between the representative terminal MSTA and the management terminal 110, and between the belonging terminal SSTA and the management terminal 110, a concept of the authentication processing performed by the wireless communication system 100 according to the first embodiment is briefly described with reference to FIG. 1.

Assuming that the respective three communication terminals 120 illustrated in FIG. 1 are still terminals STA which are not yet authenticated by the management terminal 110, and do not belong to any group (period 101). One of the terminals STA transmits a predetermined beacon (first beacon) at its own timing and tries to detect other terminals STA so as to form a new group with the other terminals STA (period 102). The own timing can be set arbitrarily.

As a result of the detection, the three terminals STA form one group. In the formed group, one of the communication terminals 120 becomes the representative terminal MSTA, and the remaining communication terminals 120 become the belonging terminals SSTA (period 103). The representative terminal MSTA manages identification information (IDs, addresses, and the like) of all of the belonging terminals SSTA which belong to the group.

When the representative terminal MSTA enters a communication area of the management terminal 110 and receives a predetermined beacon (second beacon) from the management terminal 110, the representative terminal MSTA requests, on behalf of the group, the management terminal 110 to authenticate the representative terminal MSTA and all of the belonging terminals SSTA, which belong to the group (period 104).

Then, when an authentication response from the management terminal 110 is received, the representative terminal MSTA becomes the authenticated terminal ASTA, and all of the belonging terminals SSTA which belong to the group also become the authenticated terminals ASTA (period 105).

Figure 2:
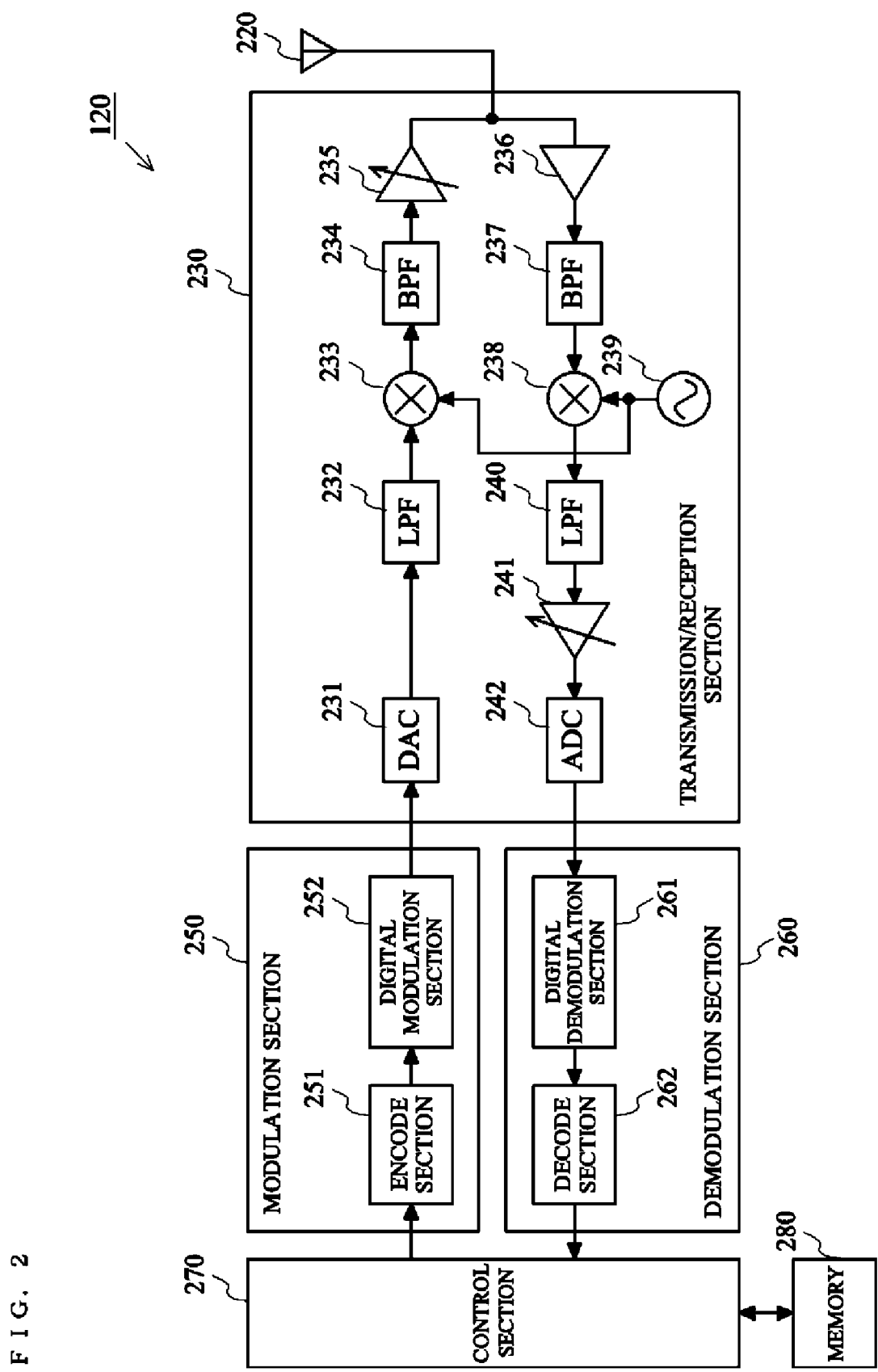
FIG. 2 is a diagram illustrating an exemplary and detailed configuration of a communication terminal 120.

FIG. 2 is a diagram illustrating an exemplary and detailed configuration of the communication terminal 120. In FIG. 2, the communication terminal 120 includes an antenna 220, a transmission/reception section 230, a modulation section 250, a demodulation section 260, a control section 270, and a memory 280. The modulation section 250 includes an encode section 251 and a digital modulation section 252. The demodulation section 260 includes a digital demodulation section 261 and a decode section 262. The transmission/reception section 230 includes a digital-to-analog converter 231, low pass filters 232 and 240, mixers 233 and 238, bandpass filters 234 and 237, a power amplifier 235, a low-noise amplifier 236, a local oscillator 239, a variable gain amplifier 241, and an analog-to-digital converter 242.

The memory 280 stores information indicating which terminal state the communication terminal 120 is in among the following: the terminal STA, the representative terminal MSTA, the belonging terminal SSTA, and the authenticated terminal ASTA. Further, the memory 280 stores identification information received from other communication terminals 120. The control section 270 performs, based on the terminal state, stored in the memory 280, of the own communication terminal 120, generation of necessary transmission data and processing on received data. The transmission data generated by the control section 270 is converted to transmission signals by the modulation section 250. The transmission signals are converted to radio-frequency signals by the transmission/reception section 230, and then transmitted from the antenna 220. Radio-frequency signals received from the antenna 220 are converted to received signals by the transmission/reception section 230. The received signals are converted to received data by the demodulation section 260, and then inputted to the control section 270. The modulation section 250 and the demodulation section 260 each may be realized by a digital signal processing circuit, or alternatively, by a processor such as a DSP or the like. Further, the management terminal 110 can be realized in the same manner.

Figure 3:
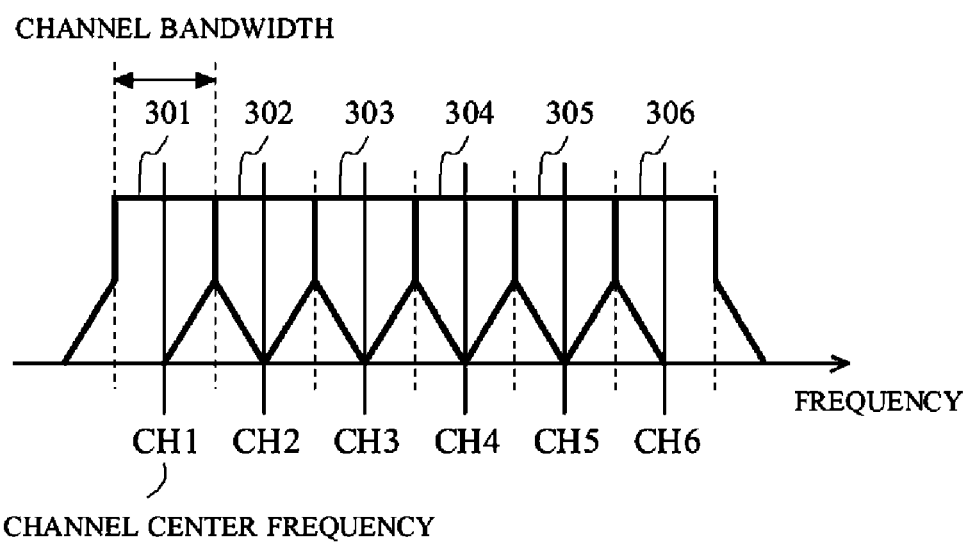
FIG. 3 is a diagram illustrating an example of wireless channels.

FIG. 3 is a diagram illustrating an example of wireless channels. FIG. 3 represents a spectrum mask in which a horizontal axis represents a frequency, and bands 301-306 represent channel bandwidths of channels CH1-CH6, respectively. The communication terminal 120 and the management terminal 110 each select a wireless channel, which is used for communication, from among these wireless channels so as to communicate with a partner terminal. Even in a system where there is only one wireless channel to be used for communication, the present invention is, of course, applicable by using time-division communication or the like.

Figure 4:
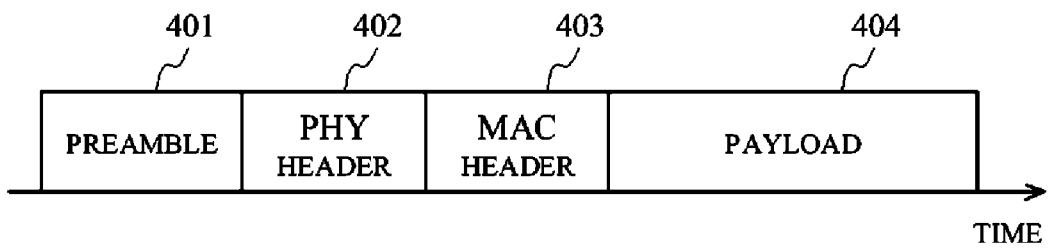
FIG. 4 is a diagram illustrating an example of a communication packet transmitted and received by a management terminal 110 and the communication terminal 120.

FIG. 4 is a diagram illustrating an example of a communication packet which is transmitted and received by the management terminal 110 and the communication terminal 120. The communication packet illustrated in FIG. 4 includes a preamble 401, a PHY (physical layer) header 402, a MAC (media access control) header 403, and a payload 404. The preamble 401 is a signal for the demodulation section 260 to perform time synchronization or frequency synchronization of the packet. The PHY header 402 stores a data start position, a data modulation scheme, a data length, and the like, which are parameters necessary for demodulation. The MAC header 403 stores an address, a control command, and the like, which are parameters necessary for access. The payload 404 stores transmission data and control data. Information indicating a data type and information indicating the terminal state of the communication terminal 120 are included in the MAC header 403.

(2) Detailed Description 2-1. Control Flowchart for Each Terminal State

Next, the authentication processing performed between the management terminal 110 and the communication terminal 120 is described in detail with reference to FIGS. 5-12C. FIGS. 5-9 are flowcharts illustrating processing performed by the terminal STA, the belonging terminal SSTA, the representative terminal MSTA, the management terminal AP, and the authenticated terminal ASTA, respectively. FIG. 10A through FIG. 12C are diagrams illustrating processing sequences performed by the management terminal 110 and the communication terminals 120.

Figure 5:
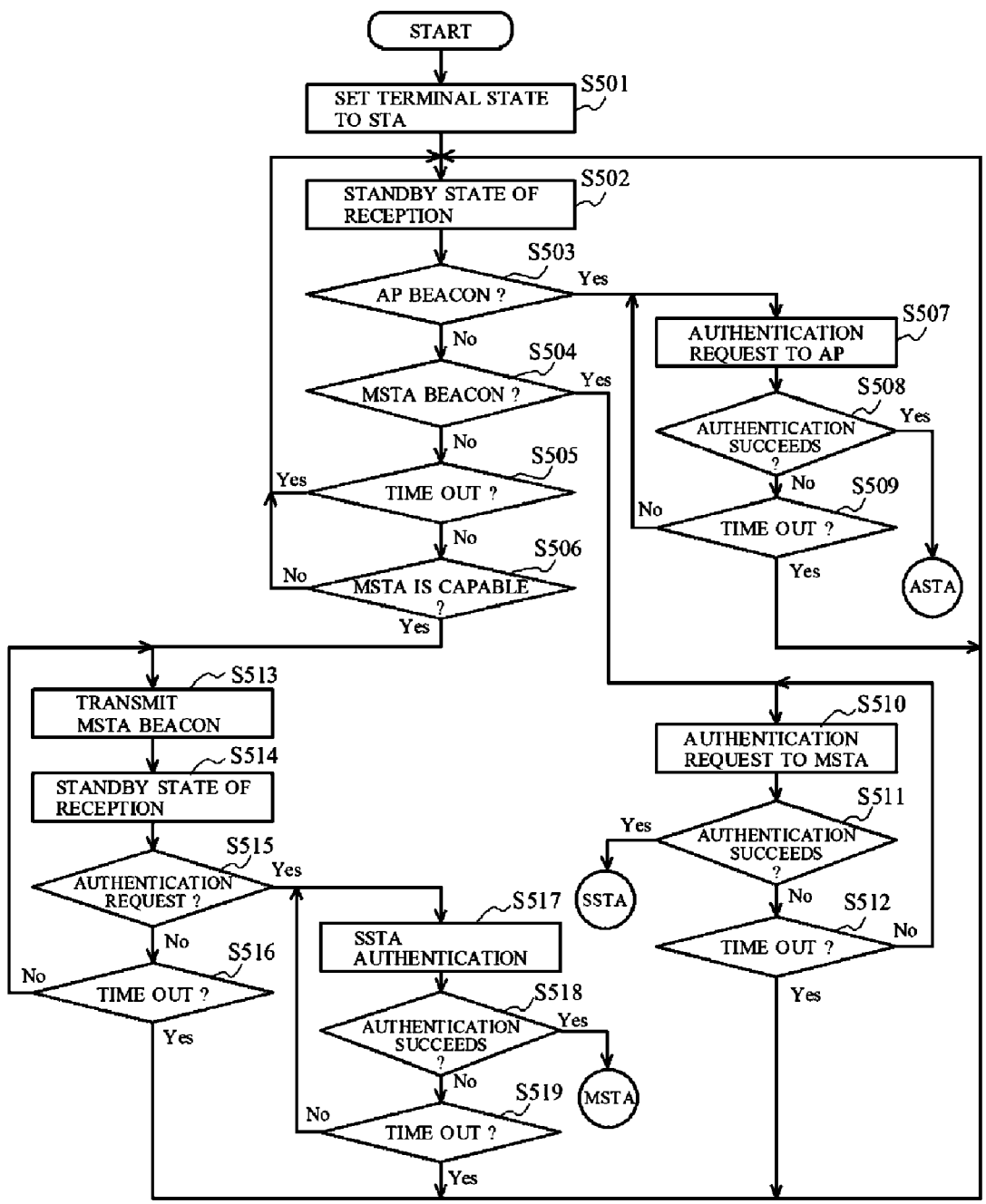
FIG. 5 is a diagram illustrating an exemplary flow of control performed by a terminal STA.

FIG. 5 is a diagram illustrating an exemplary flowchart of control performed by the terminal STA.

Initially, when starting an operation at the time of power-on or the like, the communication terminal 120 sets its terminal state to STA (step S501). At this time, a period for operating as the terminal STA, a sleep period, a wireless channel, and the like are initialized. The initialized terminal STA enters a beacon reception standby state (step S502), and determines whether or not an AP beacon (a second beacon), which is transmitted from the management terminal 110, and an MSTA beacon (a first beacon), which is transmitted from the representative terminal MSTA, has been received (steps S503 and S504). Note that transmission and reception of information related to the first beacon are performed by a first reception section (not shown) of the transmission/reception section 230, and transmission and reception of information related to the second beacon is performed by a second reception section (not shown) of the transmission/reception section 230.

When receiving the AP beacon, the terminal STA directly requests the management terminal 110 for authentication (step S507). When the authentication succeeds by a predetermined time-out moment, the terminal STA changes its terminal state to the authenticated terminal ASTA, but when the authentication fails, the terminal STA returns to step S502 to repeatedly perform the processing steps (steps S508 and S509). When receiving the MSTA beacon, the terminal STA requests the representative terminal MSTA, which has transmitted the MSTA beacon, for authentication (step S510). When the authentication succeeds by a predetermined time-out moment, the terminal STA changes its terminal state to the belonging terminal SSTA which belongs to the group of the representative terminal MSTA, but when the authentication fails, the terminal STA returns to step S502 to repeatedly perform the processing steps.

On the other hand, when a beacon is not received either from the management terminal 110 or from the representative terminal MSTA by the predetermined time-out moment, the terminal STA determines whether or not the terminal STA is capable of operating as the representative terminal MSTA (steps S505 and S506). The determination may be performed based on, for example, its own battery condition, performance of the transmission/reception section and of the modulation/demodulation section, random numbers, or the like. When determining the terminal STA to be capable of operating as the representative terminal MSTA, the terminal STA performs a process of transmitting the MSTA beacon and waits for a response from another terminal STA (steps S513 and S514).

Subsequently, when receiving, from another terminal STA, a response of an authentication request, the terminal STA performs a process of authenticating the source terminal STA so as to be a belonging terminal SSTA in accordance with the received authentication request (steps S515 and S517). When the authentication succeeds by a predetermined time-out moment, the terminal STA changes its terminal state to the representative terminal MSTA which manages a new group, but when the authentication fails, the terminal STA returns to step S502 to repeatedly perform the processing steps (steps S518 and S519). Note that when a response of an authentication request is not received from another terminal STA by the predetermined time-out moment, the terminal STA returns to step S502 to repeatedly perform the processing steps (step S516).

As a result of the above-described processing performed by the terminal STA, a plurality of terminals STA, which are located within a range that allows the MSTA beacon to be transmitted or received therefrom, can form one group. The one group includes a single representative terminal MSTA and at least one belonging terminal SSTA.

Next, control performed by the belonging terminal SSTA and the representative terminal MSTA will be described.

Figure 6:
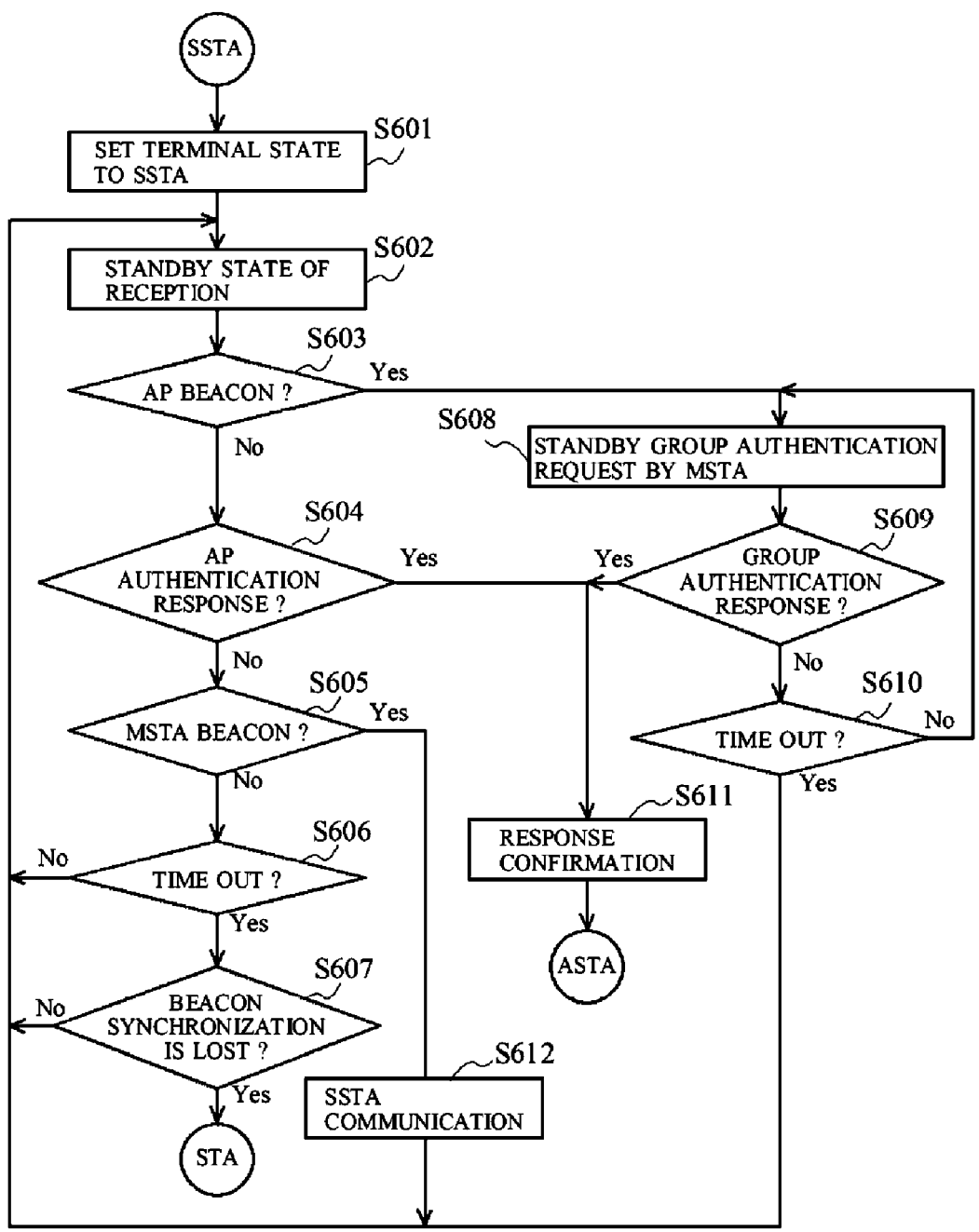
FIG. 6 is a diagram illustrating an exemplary flow of control performed by a belonging terminal SSTA.

FIG. 6 is a diagram illustrating an exemplary flow of control performed by the belonging terminal SSTA.

When the terminal state is changed to SSTA, a period for operating as the belonging terminal SSTA, a sleep period, a wireless channel, and the like are initialized (step S601). The initialized belonging terminal SSTA enters a beacon reception standby state (step S602), and determines whether or not the AP beacon has been received from the management terminal 110, the authentication response has been received from the management terminal 110, and the MSTA beacon has been received from the representative terminal MSTA (steps S603-S605).

When receiving the AP beacon, the belonging terminal SSTA stands by until a result of the representative terminal MSTA having requested the management terminal 110 for group authentication, is received (step S608). When receiving an authentication response from the management terminal 110 by a predetermined time-out moment, the belonging terminal SSTA changes its terminal state to the authenticated terminal ASTA after confirming the response, but when the authentication fails, returns to step S602 to repeatedly perform the processing steps (steps S609-S611). On the other hand, when receiving the authentication response from the management terminal 110, the belonging terminal SSTA changes its terminal state to the authenticated terminal ASTA after confirming the response (step S611).

When receiving the MSTA beacon by a predetermined time-out moment, the belonging terminal SSTA performs communication processing necessary as the belonging terminal SSTA (step S612), but when the MSTA beacon is not received by the predetermined time-out moment, the belonging terminal SSTA determines whether or not the beacon synchronization has disappeared (is lost) (steps S606 and S607). At this time, when determining that the beacon synchronization is lost, the belonging terminal SSTA determines that the belonging terminal SSTA has left the group, and then the belonging terminal SSTA changes its terminal state to the terminal STA.

Figure 7:
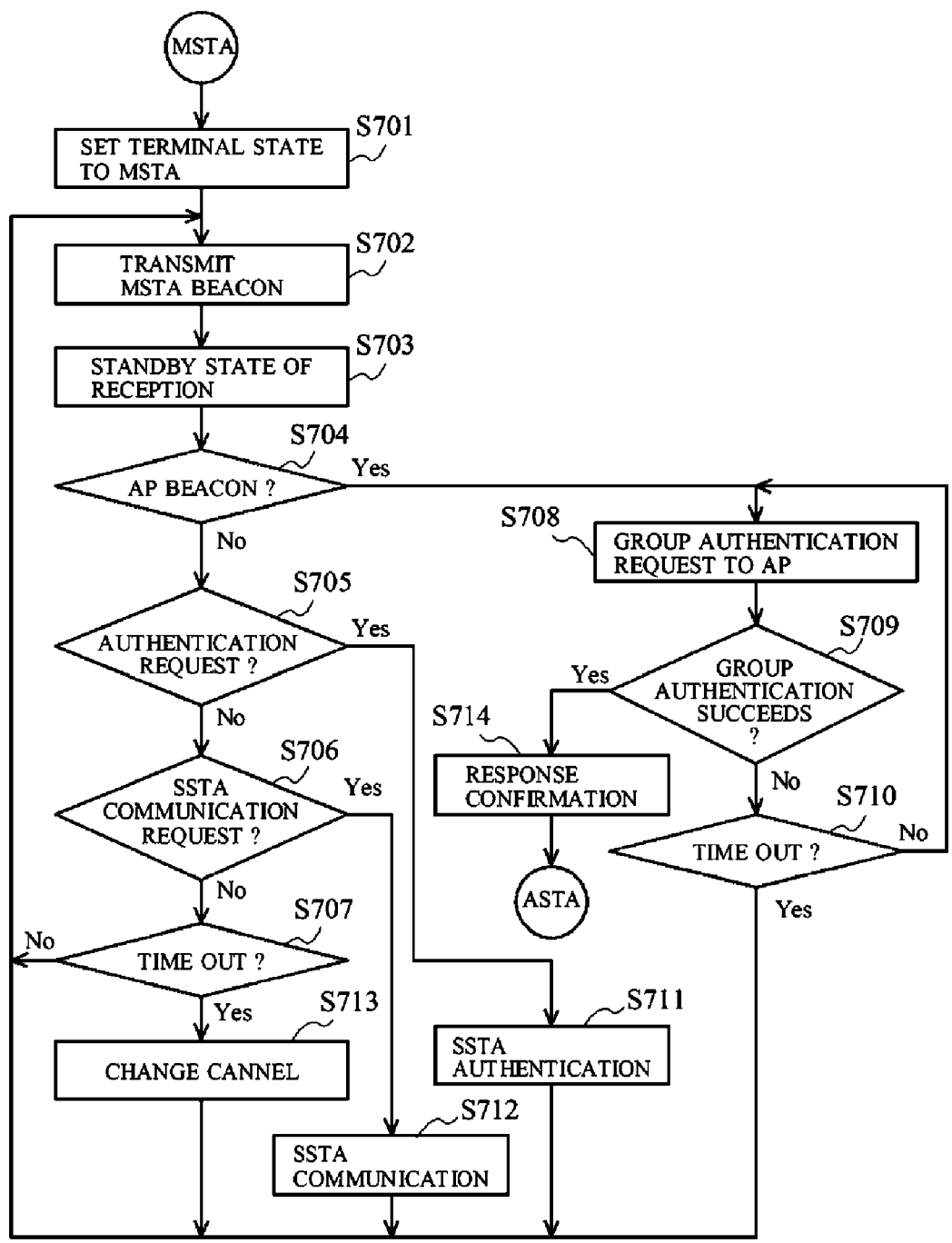
FIG. 7 is a diagram illustrating an exemplary flow of control performed by a representative terminal MSTA.

FIG. 7 is a diagram illustrating an exemplary flow of control performed by the representative terminal MSTA.

When the terminal state is changed to MSTA, a period for operating as the representative terminal MSTA, a sleep period, a wireless channel, and the like are initialized (step S701). Then, the representative terminal MSTA performs a process of transmitting the MSTA beacon and a process of standing by to receive a response from the belonging terminal SSTA (steps S702 and S703).

When receiving the AP beacon from the management terminal 110, the representative terminal MSTA requests the management terminal 110 for group authentication (steps S704 and S708). When receiving an authentication response by a predetermined time-out moment, the representative terminal MSTA changes its terminal state to be the authenticated terminal ASIA after confirming the response, but when the authentication fails, the representative terminal MSTA returns to step S702 to repeatedly perform the processing steps (steps S709, S710, and S714). On the other hand, when receiving an authentication request or a communication request from a belonging terminal SSTA by the predetermined time-out moment, the representative terminal MSTA performs a process of authenticating or communicating with the belonging terminal SSTA (steps S705-S707, s711, and S712). Note that when the AP beacon, the authentication request and the communication request from the belonging terminal SSTA are not received by the predetermined time-out moment, the representative terminal MSTA changes a currently using wireless channel and repeatedly performs the processing steps from step S702 (step S713).

Figure 8:
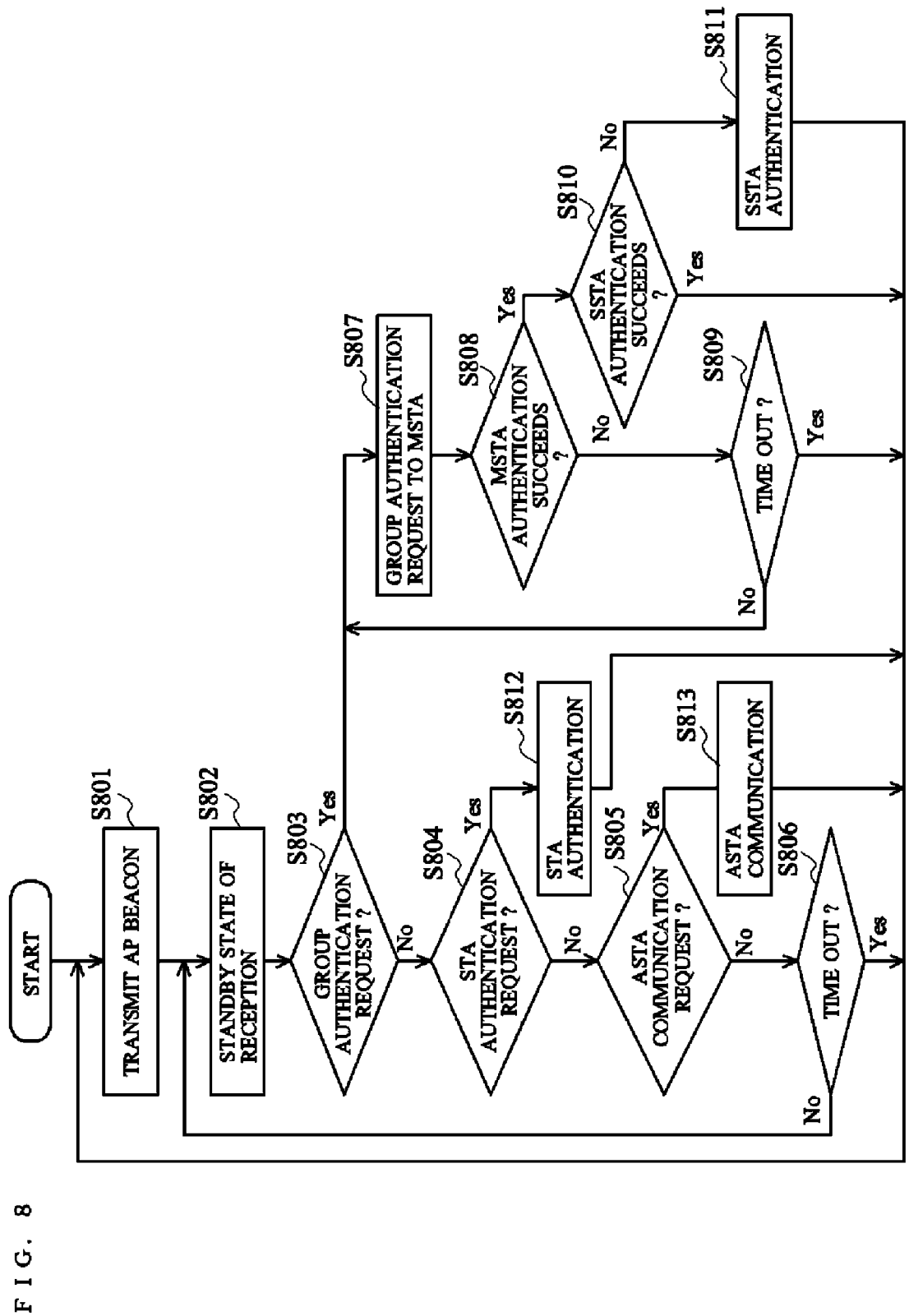
FIG. 8 is a diagram illustrating an exemplary flow of control performed by a management terminal AP.

FIG. 8 is a diagram illustrating an exemplary flow of control performed by the management terminal 110.

The management terminal 110 performs a process of transmitting the AP beacon, and a process of standing by to receive responses from respective communication terminals 120 (steps S801 and S802).

When receiving a group authentication request from the representative terminal MSTA, the management terminal 110 performs a group authentication response to the representative terminal MSTA (steps S803 and S807). Then, when the authentication of the representative terminal MSTA and the belonging terminal SSTA succeeds by a predetermined time-out moment, the management terminal 110 returns to step S802 to repeatedly perform the processing steps (steps S808-S811). On the other hand, when receiving the authentication request from the terminal STA or the communication request from the authenticated terminal ASTA by a predetermined time-out moment, the management terminal 110 performs a process of authenticating the terminal STA or a process of communicating with the authenticated terminal ASTA (steps S804-S806, S812, and S813).

Figure 9:
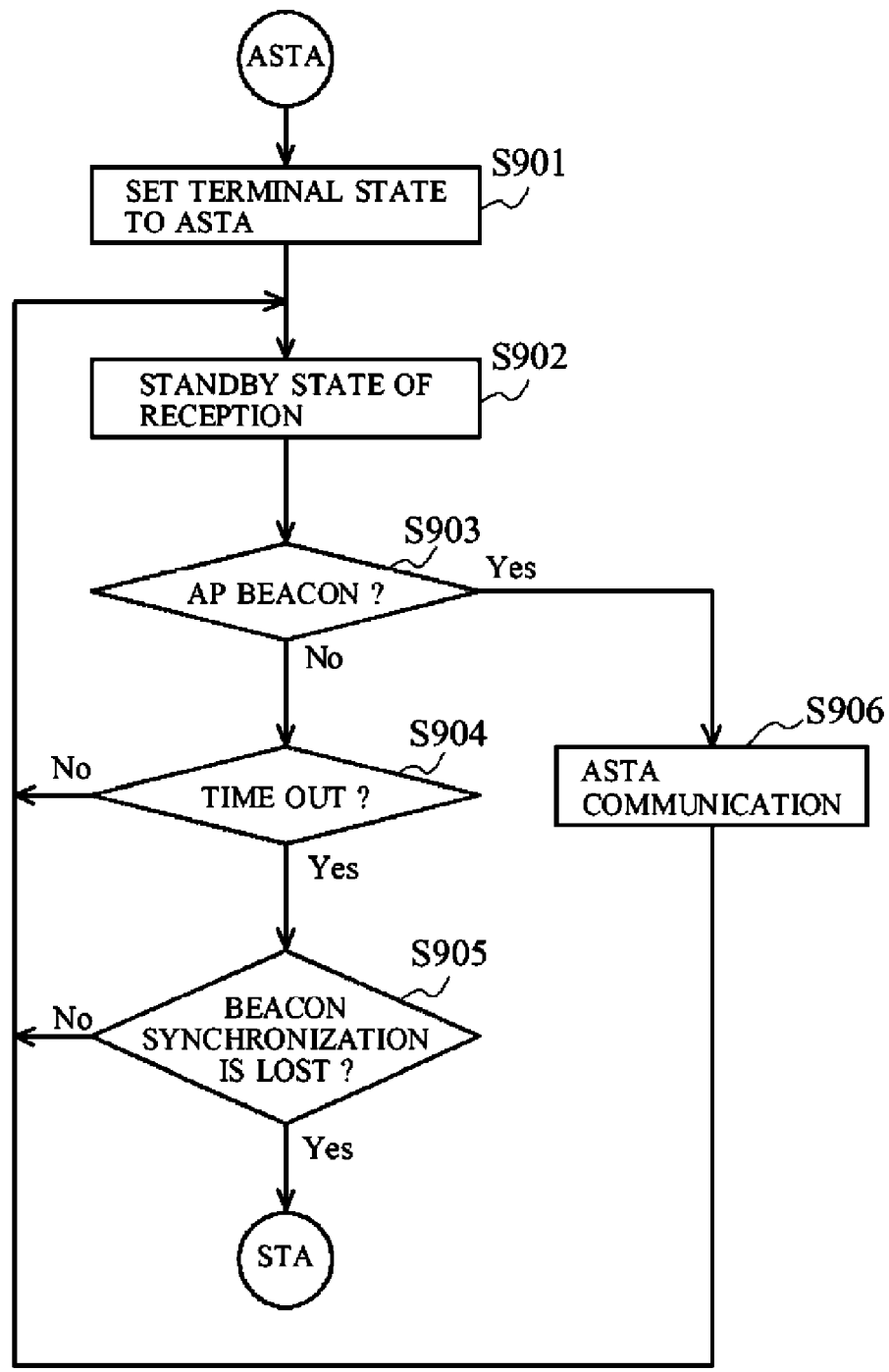
FIG. 9 is a diagram illustrating an exemplary flow of control performed by an authenticated terminal ASTA.

FIG. 9 is a diagram illustrating an exemplary flow of control performed by the authenticated terminal ASTA.

When the terminal state is changed to ASTA, a period for operating as the authenticated terminal ASTA, a sleep period, a wireless channel, and the like are initialized (step S901). Then, the authenticated terminal ASIA performs a process of standing by to receive a response from the management terminal 110 (step S902).

When receiving the AP beacon from the management terminal 110 by a predetermined time-out moment, the authenticated terminal ASTA performs communication processing necessary as the authenticated terminal ASTA (steps S903 and S906), but when the AP beacon is not received by the predetermined time-out moment, the authenticated terminal ASTA determines whether or not the beacon synchronization is lost (steps S903-S905). When determining that the beacon synchronization is lost, the authenticated terminal ASTA changes its terminal state to the terminal STA.

2-2. Sequence of Group Forming Processing

Figure 10A:
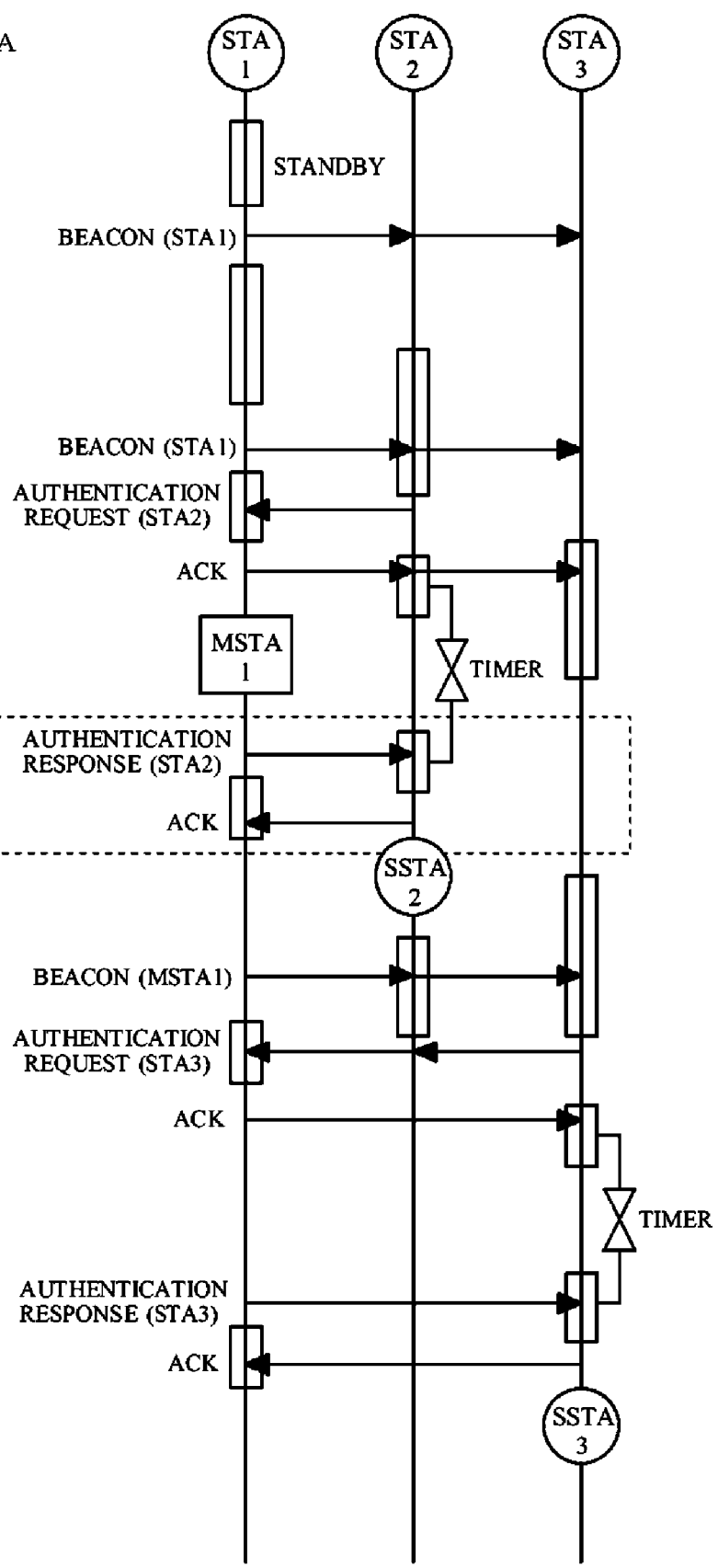
FIG. 10A is a sequence diagram illustrating an example of group forming processing.

FIG. 10A is a sequence diagram illustrating an example of group forming processing. FIG. 10A illustrates a case where three terminals STA1-STA3 form one group. Note that signal transmission and reception among the terminals are performed based on the packet format illustrated in FIG. 4.

Initially, the terminal STA1 stands by to receive a beacon for a certain time period so as to confirm whether or not other terminals are transmitting a beacon. Since a beacon is not received even after the certain time period has elapsed, the terminal STA1 transmits a beacon (STA1) for becoming the representative terminal MSTA. After transmitting the beacon (STA1), the terminal STA1 stands by for a certain time period so as to receive a response from another terminal. Note that when no response is received, the terminal STA1 repeatedly transmits the beacon (STA1).

It is assumed that the terminal STA2 enters a reception standby state at this time. The terminal STA2 receives the beacon (STA1) which is transmitted by the terminal STA1, and transmits an authentication request (STA2) to the terminal STA1. When receiving the authentication request (STA2) from the terminal STA2, the terminal STA1 transmits a reception acknowledgement (ACK) to the terminal STA2 as well as changing its own terminal state to the representative terminal MSTA1 so as to perform authentication processing. When receiving the ACK from the representative terminal MSTA1, the terminal STA2 determines that the authentication request has been performed and enters a standby state for a predetermined time period until an authentication response is transmitted.

Next, it is assumed that the terminal STA3 enters a reception standby state at this time. The terminal STA3 receives the ACK which is transmitted from the terminal STA1 to the terminal STA2. Accordingly, the terminal STA3 determines that another terminal is located in the vicinity thereof, and adjusts the timing of the reception standby so as to receive a beacon.

The representative terminal MSTA1 transmits an authentication response (STA2) to the terminal STA2 within a predetermined time period from the reception of the authentication request (STA2). The terminal STA2 releases the standby state after a predetermined time period has elapsed, and enters a reception standby state. Then, the terminal STA2 receives the authentication response (STA2) from the representative terminal MSTA1, and transmits the ACK to the representative terminal MSTA1. When the representative terminal MSTA1 receives the ACK, the authentication of the terminal STA2 is completed. At this time, the terminal STA2 changes its own terminal state to a belonging terminal SSTA2. The representative terminal MSTA1 repeats the above processing in the same manner for the terminal STA3.

Figure 10B:
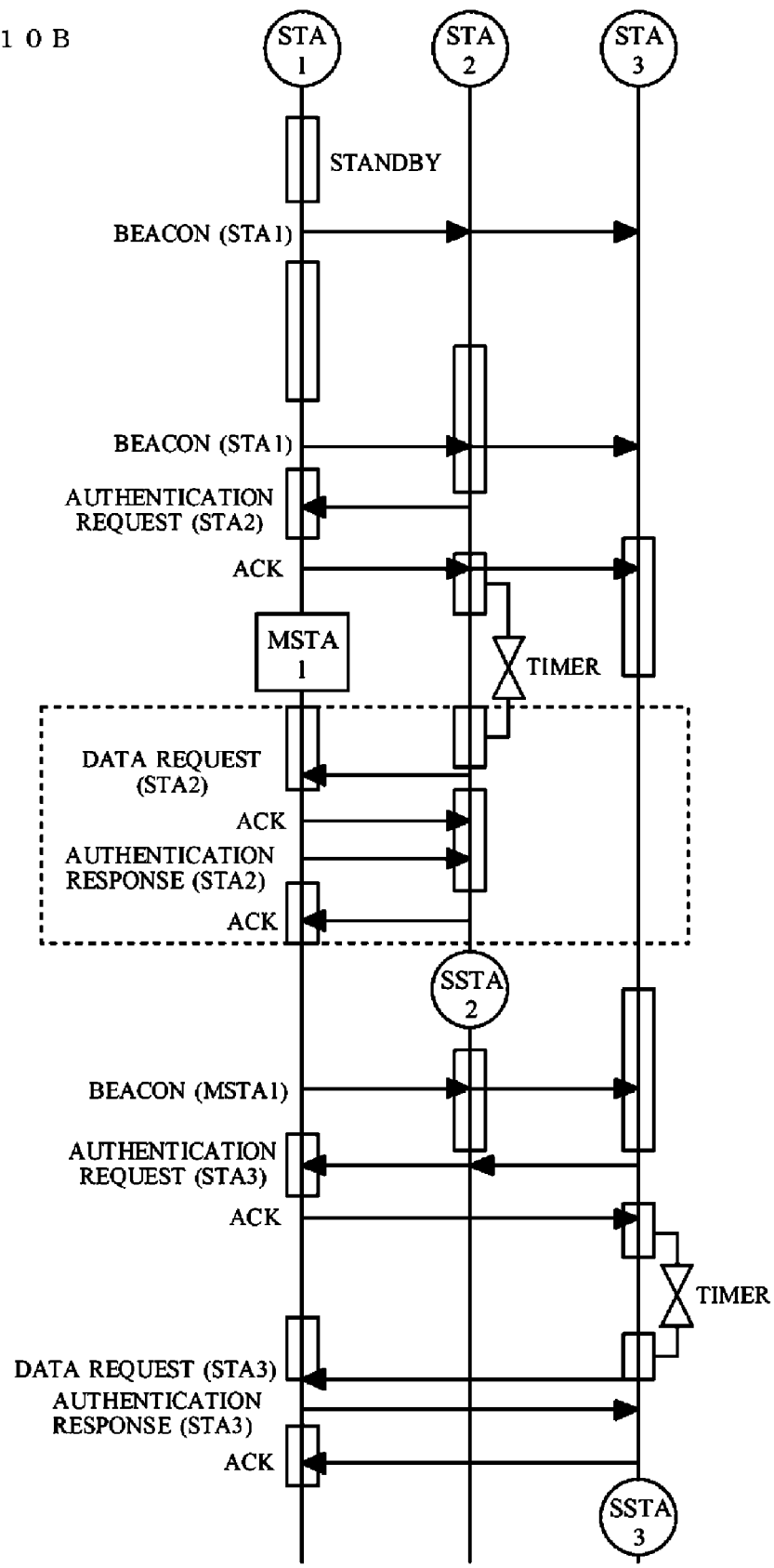
FIG. 10B is a sequence diagram illustrating another example of group forming processing.

Alternatively, as illustrated in FIG. 10B, the terminal STA2 may voluntarily request the representative terminal MSTA1 for the authentication response (STA2). In such a case, the terminal STA2 releases the standby state after a predetermined time period has elapsed, and then transmits a data request (STA2) to the representative terminal MSTA1. The data request includes a data request command and an address of a request source. After transmitting the data request (STA2), the terminal STA2 enters a standby state for a certain time period.

When the representative terminal MSTA1 receives the data request (STA2) and data to be transmitted to the address of the request source exists, the representative terminal MSTA1 transmits the data. In this case, since the authentication response (STA2) to the terminal STA2 exists, the representative terminal MSTA1 transmits the authentication response (STA2) to the terminal STA2. When receiving the authentication response (STA2), the terminal STA2 transmits an ACK to the representative terminal MSTA1.

2-3. Sequence of Group Authentication Processing

FIG. 11A is a sequence diagram illustrating an example of group authentication processing. FIG. 11A illustrates a case where authentication is performed between the management terminal 110 and a group which is formed of the representative terminal MSTA1, the belonging terminal SSTA2, and the belonging terminal SSTA3. Note that transmission and reception of signals among the terminals is performed based on the packet format illustrated in FIG. 4.

Initially, the management terminal 110 periodically transmits a beacon (AP, CCH), and then enters a reception standby state for a predetermined time period. When receiving the beacon (AP, CCH), the representative terminal MSTA1 transmits a group authentication request (STA1-3, CH). The belonging terminals SSTA2 and SSTA3 are synchronizing with the representative terminal MSTA1, so as to be capable of receiving a packet transmitted from the representative terminal MSTA1. Typically, the beacon (AP, CCH), the authentication request, and the like are transmitted through a control channel CCH different than the wireless channel. Accordingly, the beacon does not interfere with signals using the wireless channels, so that effectiveness of the authentication processing is increased. Note that the control channel CCH may be known by each terminal, or may be specified by each terminal based on the beacon (AP, CCH) detected by performing a channel search or the like.

When detecting that the representative terminal MSTA1 has transmitted the group authentication request (STA1-3, CH), the belonging terminals SSTA2 and SSTA3 each wait for an ACK to be transmitted from the management terminal 110. When receiving the ACK transmitted to the representative terminal MSTA1, the representative terminal MSTA1, the belonging terminal SSTA2, and the belonging terminal SSTA3 each determine that the group authentication processing is to be performed, enter a standby state for a predetermined time period necessary for a group authentication response, and stand by to receive the group authentication response (STA1-3) transmitted from the management terminal 110.

When receiving the group authentication responses (STA1-3), the representative terminal MSTA1, the belonging terminal SSTA2, and the belonging terminal SSTA3 each transmit an ACK to the management terminal 110. A possible transmission order of the ACK is the order of addresses included in the group authentication response, for example. Alternatively, the transmission timing of the ACK may be adjusted such that the ACKs transmitted from the respective terminals are connected so as to be identified as one ACK packet. In such a case, it is possible to further decrease a transmission time of the ACK packet by including the preamble only in the first ACK.

At the time when the management terminal 110 receives the ACKs from the respective terminals to which the management terminal 110 has transmitted the group authentication responses (STA1-3), the group authentication is completed. The management terminal 110 performs group authentication by repeatedly performing the same sequences for another group which is present within the communication area.

Figure 11B:
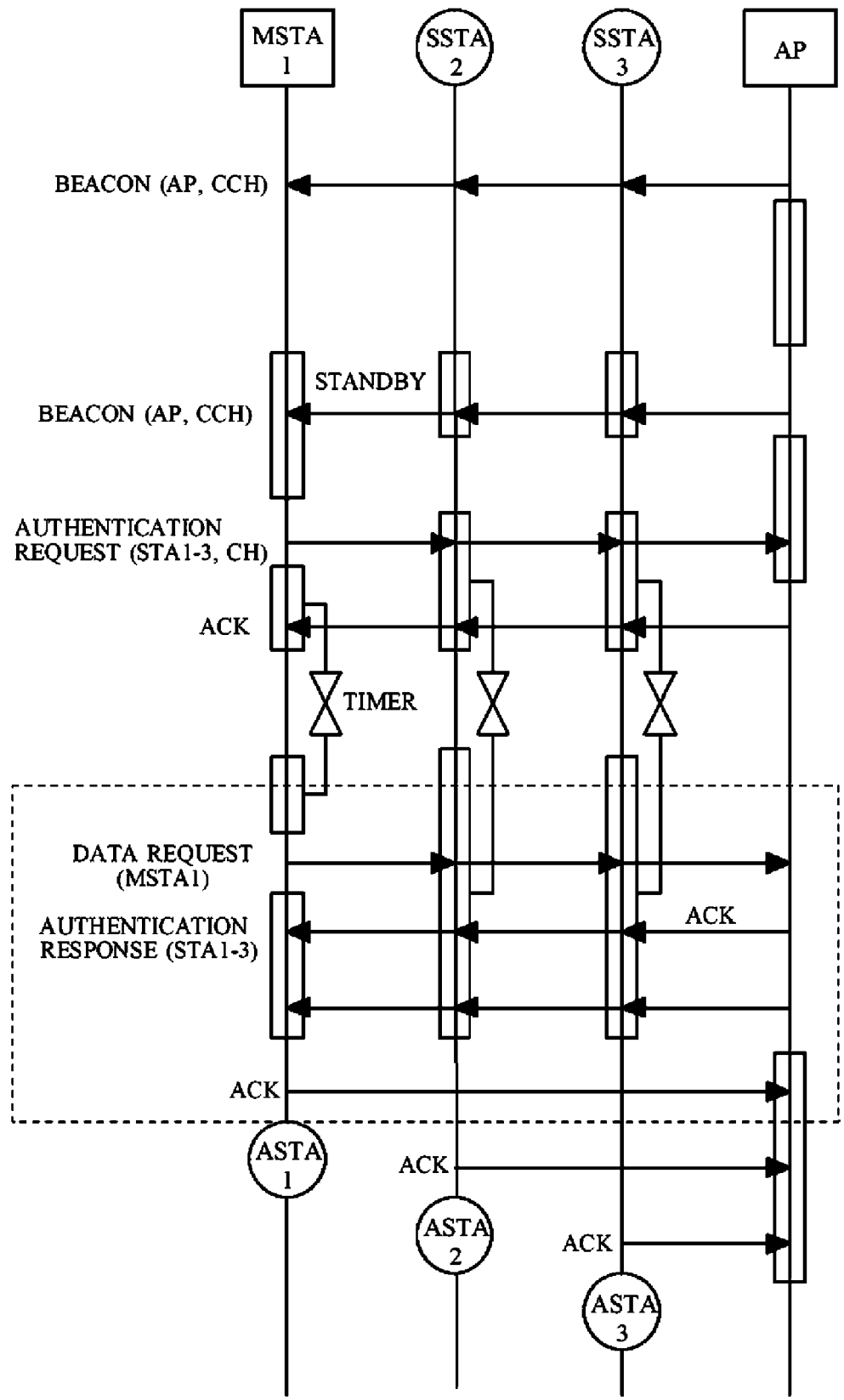
FIG. 11B is a sequence diagram illustrating another example of group authentication processing.

Alternatively, as illustrated in FIG. 11B, the representative terminal MSTA1 may voluntarily request the management terminal 110 for the group authentication responses (STA1-3). In such a case, the representative terminal MSTA1 cancels the predetermined-period-standby state that is necessary until the authentication response is prepared, and then transmits a data request (MSTA1) to the management terminal 110. When the management terminal 110 receives the data request (MSTA1) and data to be transmitted to the address of the request source exists, the management terminal 110 transmits the data. In this case, since the group authentication response data to be transmitted to the representative terminal MSTA1 exists, the management terminal 110 transmits the group authentication response data to the representative terminal MSTA1 as the group authentication response (STA1-3).

2-4. Processing Sequence of Whole Wireless Communication System

FIG. 12A is a processing sequence diagram of the whole wireless communication system based on the above description. FIG. 12A illustrates a case where six terminals STA1-STA6 form two groups and request the management terminal 110 for authentication by using one wireless channel. The processing sequences illustrated in FIG. 12 are divided into group forming processing 1211, group forming processing 1212, authentication request processing 1213, and authentication response processing 1214.

The terminal STA1 transmits a beacon (STA1) so as to detect other terminals STA2 and STA3. When receiving the beacon, the terminal STA2 transmits an authentication request (STA2), which includes identification information (address and the like), to the terminal STA1, so as to belong to a group. When receiving the authentication request (STA2), the terminal STA1 starts group forming. Then, the terminal STA1 transmits an authentication response (STA2) to the terminal STA2. When the terminal STA2 successfully receives the authentication response (STA2), in-group authentication is completed. At this time, the terminal STA1 changes its terminal state to the representative terminal MSTA1, and the terminal STA2 changes its terminal state to the belonging terminal SSTA2. The same is true on the belonging terminal SSTA3. As a result of the processing, the representative terminal MSTA holds the identification information of all of the belonging terminals SSTA which belong to the group. Thereafter, the representative terminal MSTA1 periodically transmits the beacon (MSTA1), and the belonging terminals SSTA2 and SSTA3 perform communication based on the beacon (MSTA1).

On the other hand, the group forming is similarly performed for the terminals STA4-STA6, and a representative terminal MSTA5, and belonging terminals SSTA4 and SSTA6 are determined. Thereafter, the representative terminal MSTA5 periodically transmits a beacon (MSTA5), and the belonging terminals SSTA4 and SSTA6 perform communication based on the beacon (MSTA5).

When the representative terminals MSTA1 and MSTA5 receive the beacon (AP) after the groups are formed, the representative terminals MSTA1 and MSTA5 each request the management terminal 110 for authentication for its own group.

In FIG. 12A, the representative terminal MSTA1 initially performs the authentication request. The representative terminal MSTA1 transmits a group authentication request (STA1-3) to the management terminal 110. The group authentication request (STA1-3) includes a group authentication request command, an address of the representative terminal MSTA1, and addresses of the belonging terminals SSTA2 and SSTA3. After transmitting the group authentication request (STA1-3), the representative terminal MSTA1 enters a standby state for a predetermined time period until an authentication response (STA1-3) is returned from the management terminal 110.

Next, the representative terminal MSTA5 performs an authentication request. The representative terminal MSTA5 transmits a group authentication request (STA4-6) to the management terminal 110. The group authentication request (STA4-6) includes a group authentication request command, an address of the representative terminal MSTA5, and addresses of the belonging terminals SSTA4 and SSTA6. After transmitting the group authentication request (STA4-6), the representative terminal MSTA5 enters a standby state for a predetermined time period until an authentication response (STA4-6) is returned from the management terminal 110.

The management terminal 110 is capable of detecting how many and which terminals have entered the communication area of the management terminal 110, at the time of receiving the group authentication request. Based on the detection, the order of subsequent authentication can be scheduled.

When receiving the group authentication request (STA1-3) from the group of the representative terminal MSTA 1, the management terminal 110 transmits the group authentication response (STA1-3). The group authentication response (STA1-3) includes a group authentication response command, the address of the representative terminal MSTA1, and the addresses of the belonging terminal SSTA2 and SSTA3. When the respective terminals successfully receive the group authentication response (STA1-3), the authentication performed by the management terminal 110 is completed. Consequently, the representative terminal MSTA1, and the belonging terminals SSTA2 and SSTA3 become authenticated terminals ASTA1-ASTA3, respectively.

Subsequently, when receiving the group authentication request (STA4-6) from the group of the representative terminal MSTA5, the management terminal 110 transmits the group authentication response (STA4-6). The group authentication response (STA4-6) includes a group authentication response command, the address of the representative terminal MSTA5, and the addresses of the belonging terminals SSTA4 and SSTA6. When the respective terminals successfully receive the group authentication response (STA4-6), the authentication performed by the management terminal 110 is completed. Consequently, the representative terminal MSTA5, and the belonging terminals SSTA4 and SSTA6 become the authenticated terminals ASTA4-ASTA6, respectively.

When the authentication performed by the management terminal 110 is completed, the authenticated terminals ASTA1-ASTA6 perform communication within the network of the management terminal 110 in accordance with the beacon (AP).

Figure 12B:
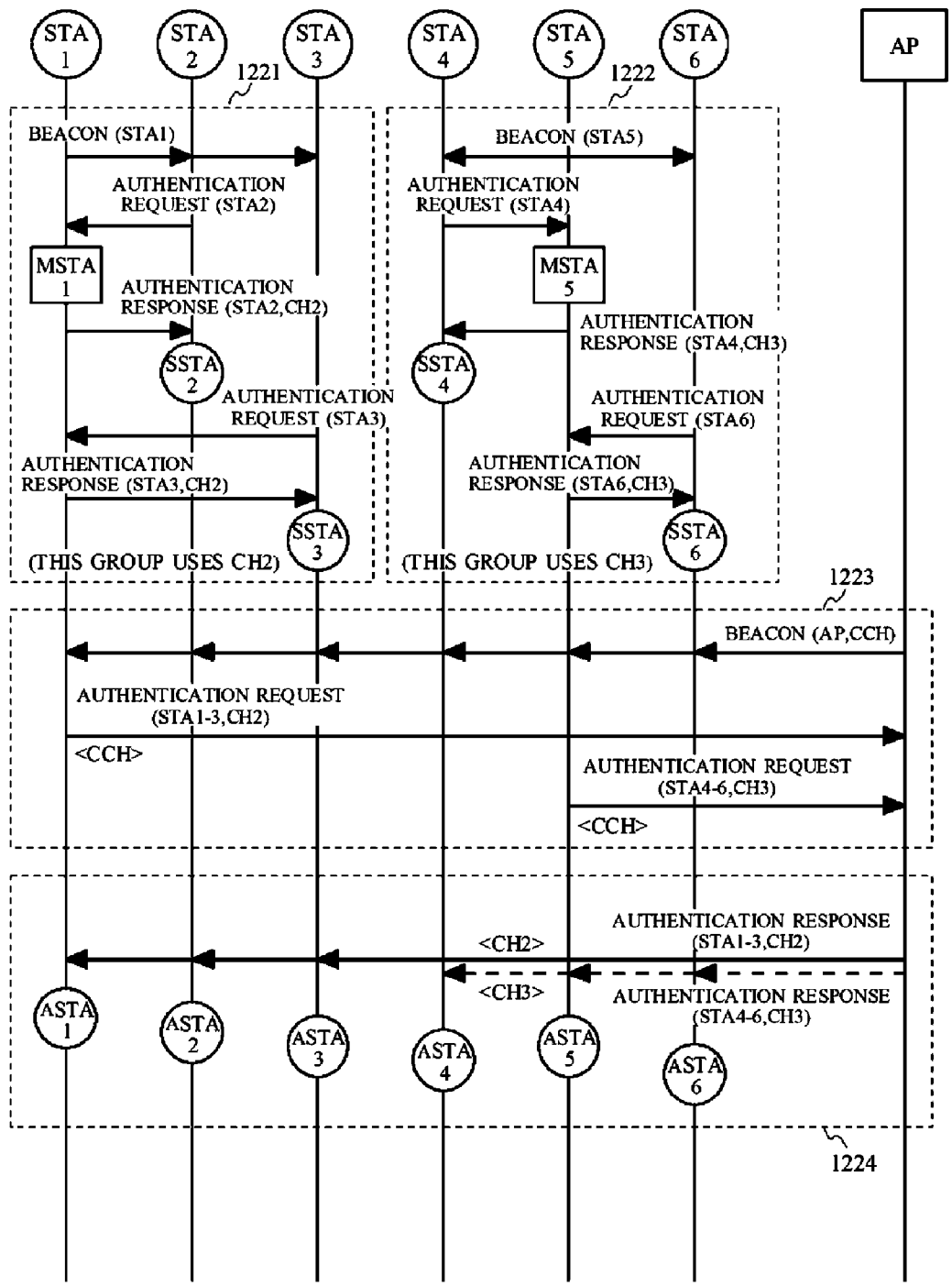
FIG. 12B is another processing sequence diagram of the whole wireless communication system.

FIG. 12B is another processing sequence diagram of the whole wireless communication system. FIG. 12B illustrates a case where two groups request the management terminal 110 for authentication by using three wireless channels in the authentication request processing 1213 in FIG. 12A. When a plurality of wireless channels are used, the number of terminals to be contained in the system can be increased. It is assumed that, in the group forming processing 1221, communication is started by using a wireless channel CH2, and in the group forming processing 1222, communication is started by using a wireless channel CH3. It is further assumed that the management terminal 110 can concurrently use a plurality of wireless channels.

After the group is formed, the representative terminals MSTA1 and MSTA5 start reception by using a control channel CCH so as to receive a beacon (AP, CCH) from the management terminal 110. When receiving the beacon (AP, CCH), the representative terminal MSTA1 transmits, to the management terminal 110, a group authentication request (STA1-3, CH2) which further includes a wireless channel number CH2 used by the group. Similarly, when receiving the beacon (AP, CCH), the representative terminal MSTA5 transmits, to the management terminal 110, a group authentication request (STA4-6, CH3) which further includes a wireless channel number CH3 used by the group.

When receiving the group authentication request (STA1-3, CH2) from the group of the representative terminal MSTA1, the management terminal 110 transmits a group authentication response (STA1-3, CH2), which further includes the wireless channel number CH2 used by the group, via the wireless channel CH2. When receiving the group authentication request (STA4-6, CH3) from the group of the representative terminal MSTA5, the management terminal 110 transmits a group authentication response (STA4-6, CH3), which further includes the wireless channel number CH3 used by the group, via the wireless channel CH3. Here, the management terminal 110 may concurrently transmit the group authentication response (STA1-3, CH2) via the wireless channel CH2, and the group authentication response (STA4-6, CH3) via the wireless channel CH3. In this manner, the time necessary for the authentication response can be further decreased. Alternatively, an ACK that provides notice of a wireless channel to be allocated may be transmitted before the transmission of the group authentication response (not shown).

When each of the terminals successfully receives the group authentication response, the authentication performed by the management terminal 110 is completed. Consequently, the representative terminal MSTA1, the belonging terminals SSTA2-SSTA4, the representative terminal MSTA5, and the belonging terminal SSTA6 become authenticated terminals ASTA1-ASTA6, respectively.

Figure 12C:
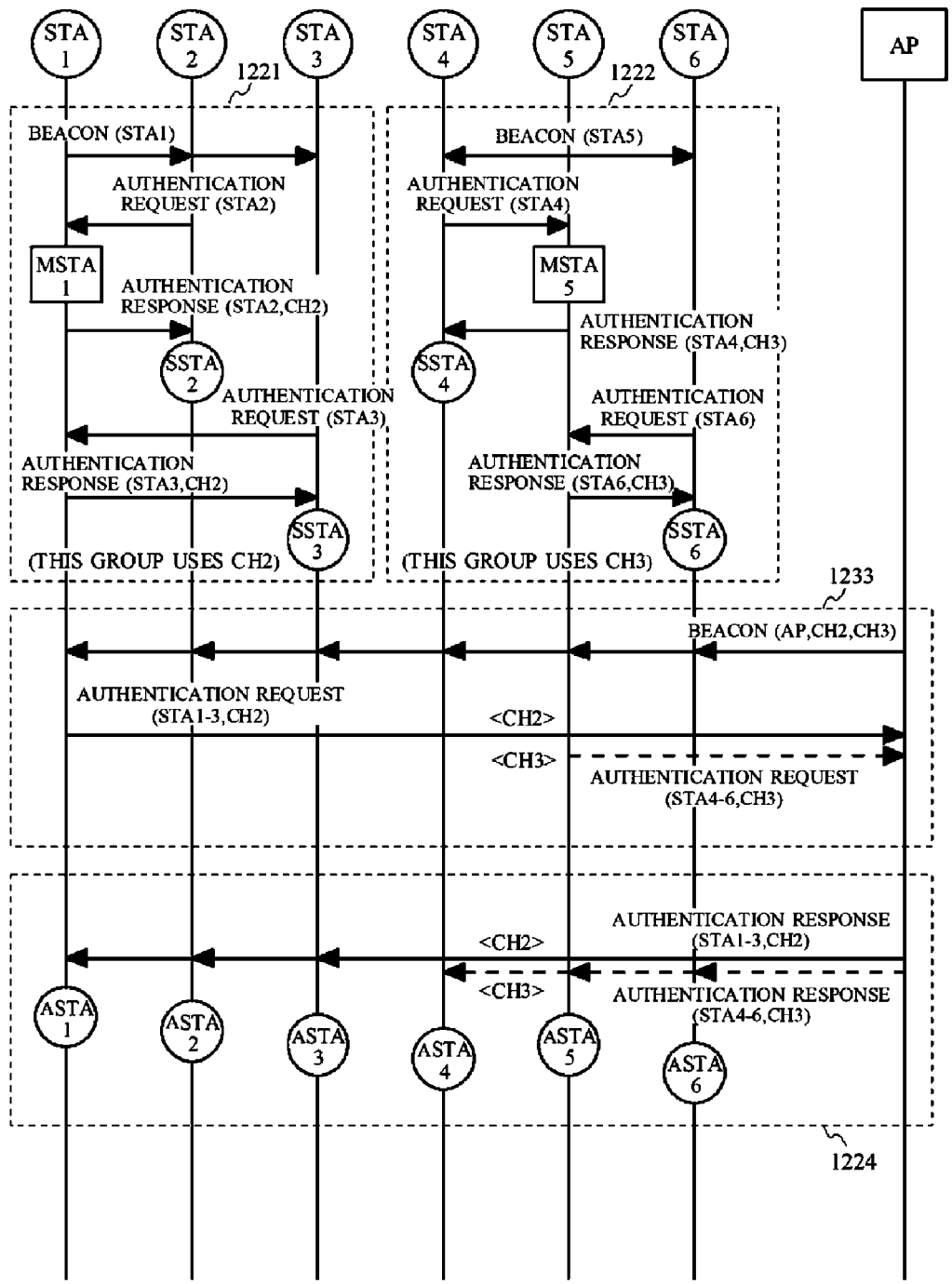
FIG. 12C is still another processing sequence diagram of the whole wireless communication system.

FIG. 12C is still another processing sequence diagram of the whole wireless communication system. The management terminal 110 performs beacon transmission by using the control channel CCH in the authentication request processing sequence 1223 in FIG. 12B. However, FIG. 12C illustrates a case where the management terminal 110 performs beacon transmission by preliminarily allocating a wireless channel to each group.

A channel allocation command for an authentication request, and a channel number of the wireless channel can be included in the beacon. Included in the beacon (AP, CH2, CH3) are, for example, the channel allocation command for an authentication request, and the wireless channels CH2 and CH3.

When receiving the beacon (AP, CH2, CH3), the representative terminal MSTA1 transmits a group authentication request (STA1-3, CH2) to the management terminal 110 by using the wireless channel CH2 which is allocated to the group of the representative terminal MSTA1. When receiving the beacon (AP, CH2, CH3), the representative terminal MSTA5 transmits a group authentication request (STA4-6, CH3) to the management terminal 110 by using the wireless channel CH3 which is allocated to the group of the representative terminal MSTA5. Here, the group authentication request (STA1-3, CH2) from the representative terminal MSTA1, and the group authentication request (STA4-6, CH3) from the representative terminal MSTA5 can be concurrently transmitted because the wireless channels are different from each other. Accordingly, the time necessary for the authentication request can be further decreased.

As described above, the wireless communication system 100 according to the first embodiment of the present invention preliminarily forms the group for each of the plurality of communication terminals 120, and determines the representative, which is capable of communicating with the management terminal 110, in each group. Accordingly, communication traffic between the plurality of communication terminals 120 and the management terminal 110 can be considerably reduced. Consequently, a collision rate in communication from the plurality of communication terminals 120 to the management terminal 110 is reduced whereby a load of the authentication processing performed by the management terminal 110 can be reduced.

<Second Embodiment>

Figure 13:
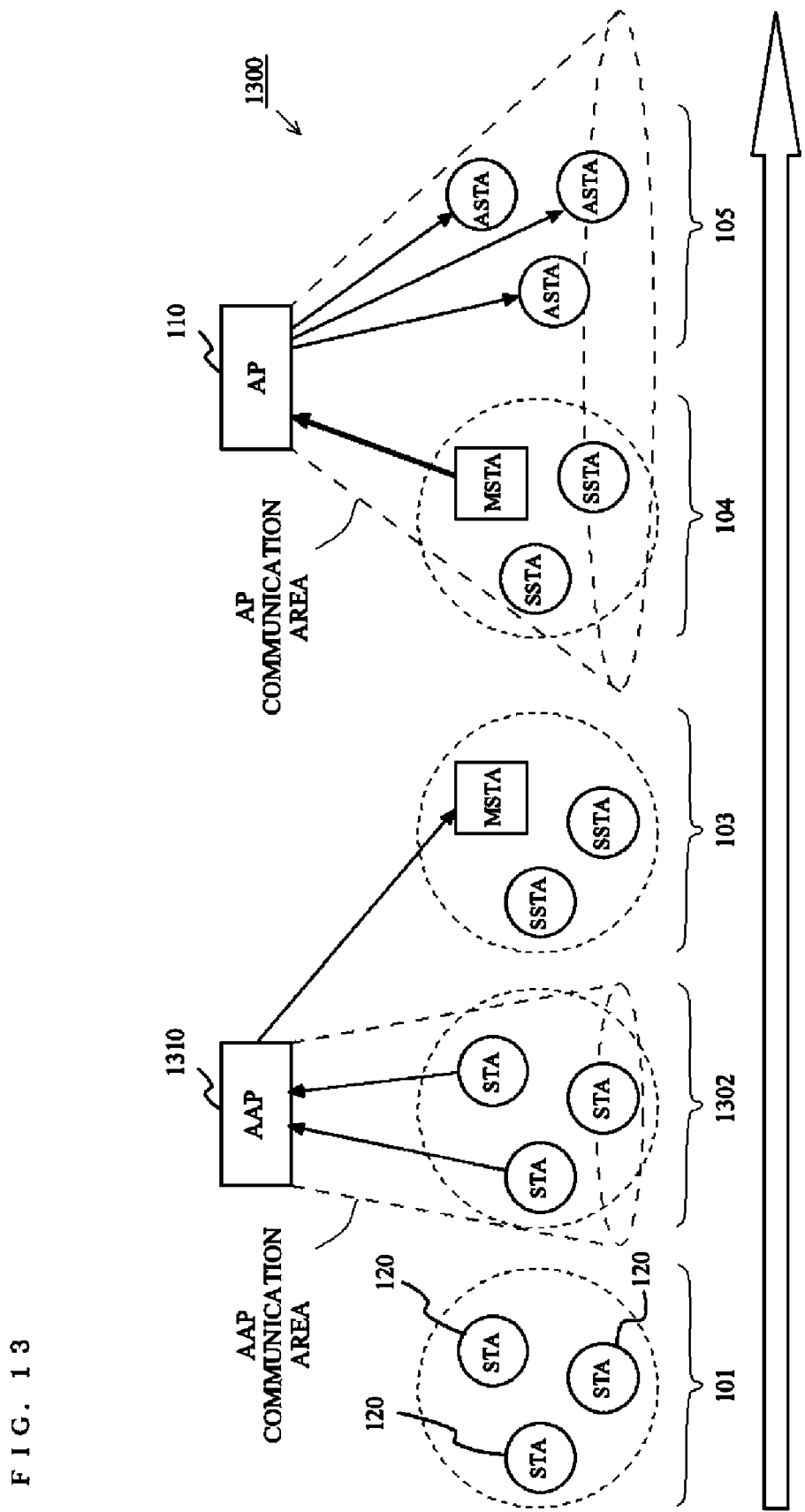
FIG. 13 is a diagram illustrating an exemplary configuration of a wireless communication system 1300 according to a second embodiment of the present invention.

FIG. 13 is a diagram illustrating an exemplary configuration of a wireless communication system 1300 according to a second embodiment of the present invention. The wireless communication system 1300 according to the second embodiment is different from the above-described wireless communication system 100 in that the wireless communication system 1300 further includes an auxiliary management terminal (AAP) 1310. Hereinafter, the second embodiment is described focusing on processing related to the auxiliary management terminal 1310. Note that the components in the wireless communication system 1300, which perform the same process as that in the wireless communication system 100, are denoted by the same reference numerals, and description thereof is omitted.

FIG. 13 illustrates that three of the communication terminals 120 move in a direction indicated by an arrow, and respective states of the communication terminals 120 change at key periods 101, 1302, 103-105, respectively, as time advances. As illustrated in FIG. 13, processing at the period 1302 is the feature of the second embodiment.

The auxiliary management terminal 1310 is configured to assist processing performed by the management terminal 110. The auxiliary management terminal 1310 performs a process of assigning, when a group of terminals STA is formed, each of the terminals STA as either a representative terminal MSTA or a belonging terminal SSTA. The auxiliary management terminal 1310 periodically transmits a beacon.

A terminal STA which does not belong to any group (period 101) tries to detect the management terminal 110 or the auxiliary management terminal 1310 (period 1302). In this case, when receiving a beacon, the terminal STA requests the auxiliary management terminal 1310 for authentication. When receiving the authentication request, the auxiliary management terminal 1310 authenticates the terminal STA, which has performed the authentication request, as either the representative terminal MSTA or the belonging terminal SSTA. At this time, a wireless channel to be used may be allocated to the terminal STA. The representative terminal MSTA, which is authenticated by the auxiliary management terminal 1310 as the representative, detects belonging terminals SSTA located in the vicinity thereof as well as performing authentication of the detected terminals, and forms a group in the same manner as in the above-described first embodiment (period 103). Processing performed at the subsequent periods 104 and 105 is the same as described above.

Figure 14:
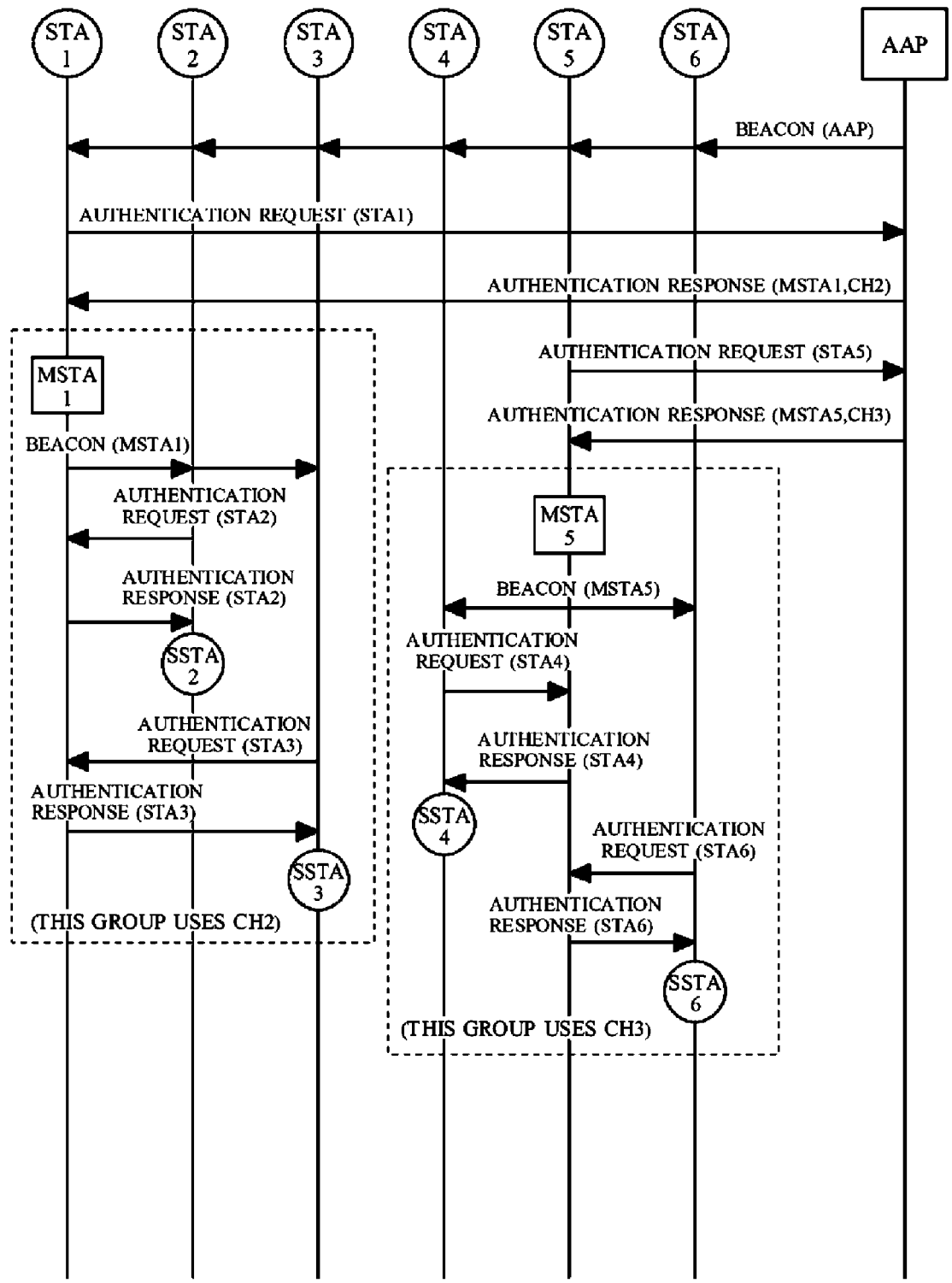
FIG. 14 is a processing sequence diagram of group forming processing using an auxiliary management terminal AAP.
Figure 15:
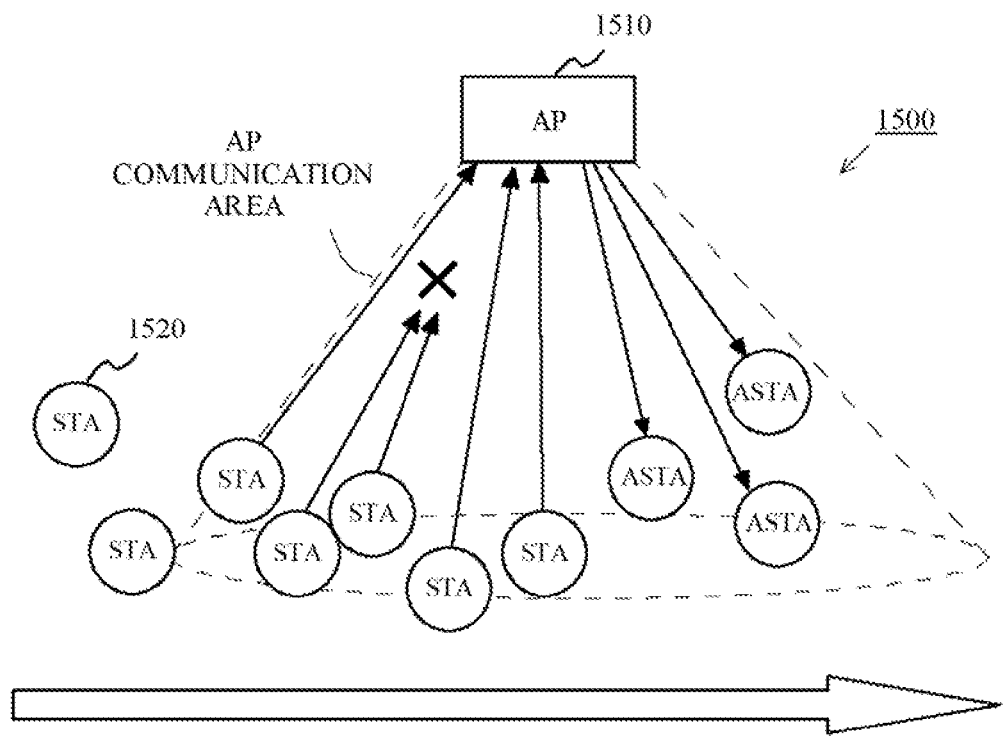
FIG. 15 is a diagram illustrating an exemplary configuration of a conventional wireless communication system.
Figure 16:
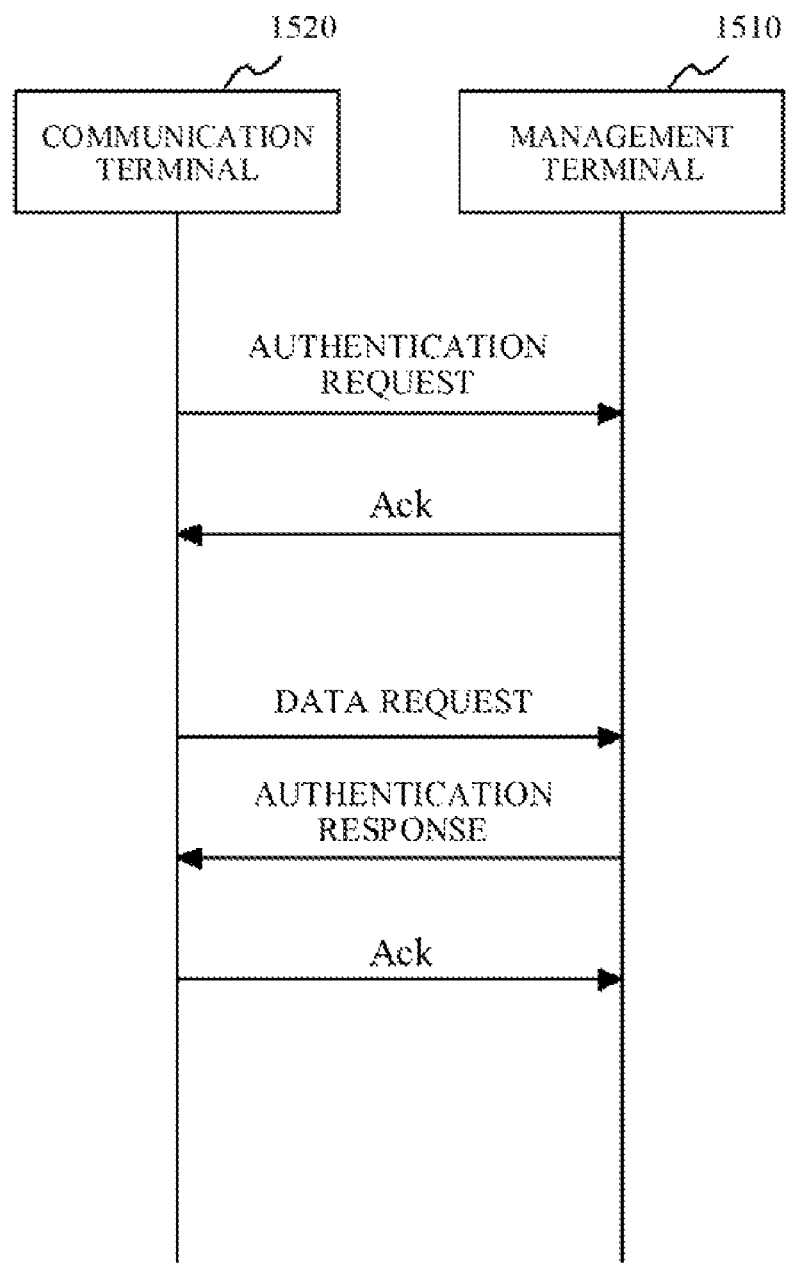
FIG. 16 is a diagram illustrating an authentication sequence under IEEE802.15.4.
Figure 17B:
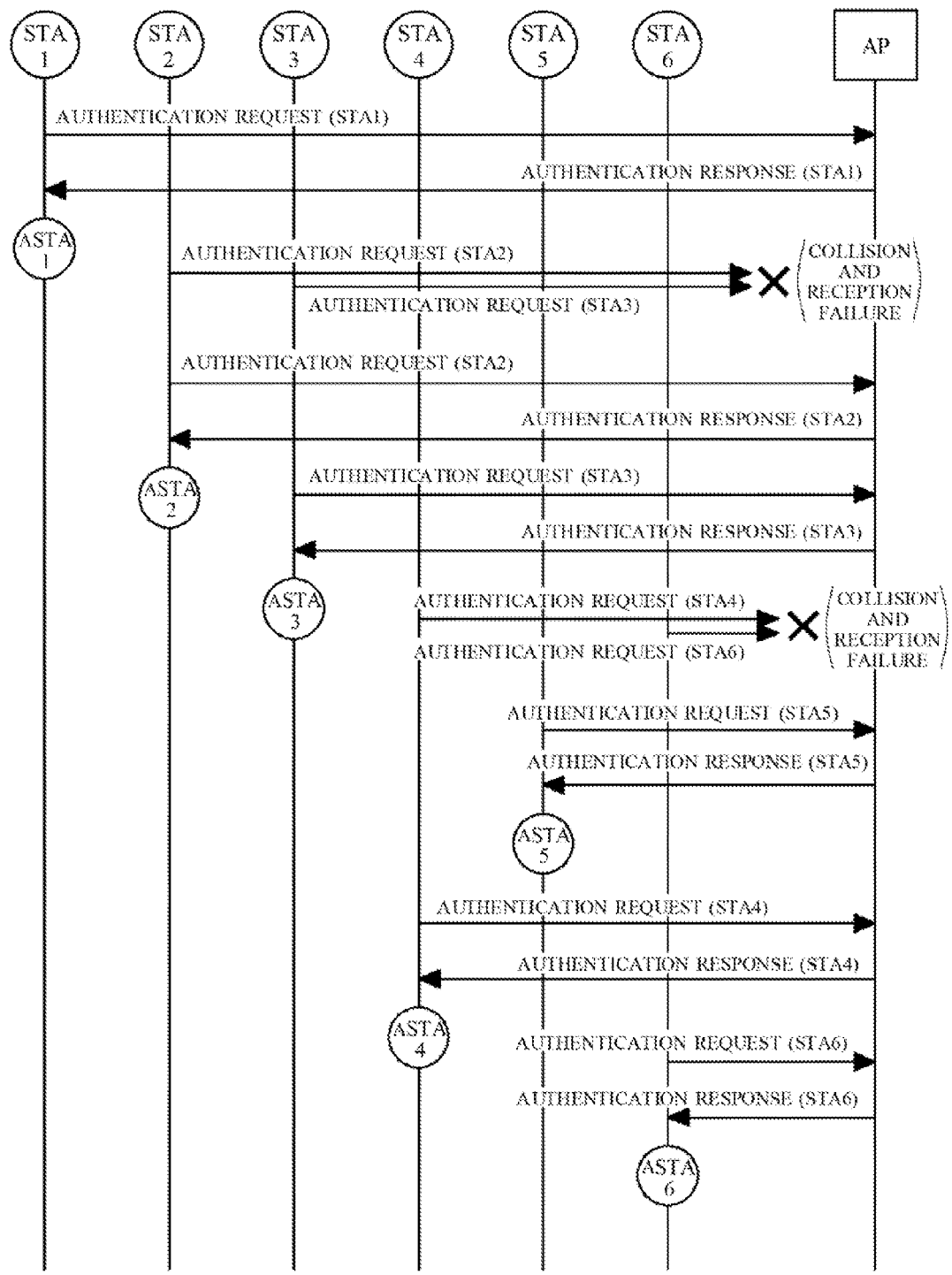
FIG. 17B is a diagram for illustrating the problem in the conventional wireless communication system.

FIG. 14 is a processing sequence diagram of group forming processing using the auxiliary management terminal 1310. The auxiliary management terminal 1310 periodically transmits a beacon (AAP) by using a control channel CCH. When receiving the beacon (AAP), a terminal STA1 transmits an authentication request (STA1) to the auxiliary management terminal 1310 since the terminal STA1 does not belong to a group.

When receiving the authentication request (STA1), the auxiliary management terminal 1310 starts terminal authentication. Here, it is assumed that the auxiliary management terminal 1310 selects to authenticate the terminal STA1 as the representative terminal and allocates a wireless channel CH2 to the terminal STA1. In such a case, the auxiliary management terminal 1310 transmits an authentication response (MSTA1, CH2). The authentication response (MSTA1, CH2) includes an authentication response command, information indicating authentication as a representative terminal, an address of the destination terminal STA1, and a wireless channel number CH2 to be used. When the authentication response (MSTA1, CH2) is successfully received by the terminal STA1, the authentication is completed. At this time, the terminal STA1 changes its own state to the representative terminal MSTA1, and changes the wireless channel to CH2. In the same manner, a terminal STA5 is authenticated as a representative terminal MSTA5 and a wireless channel CH3 is allocated.

Thereafter, the representative terminal MSTA1 performs authentication with terminals STA2 and STA3, and forms one group. Further, the representative terminal MSTA5 performs authentication with terminals STA4 and STA6, and forms one group.

As described above, the wireless communication system 1300 according to the second embodiment of the present invention preliminarily forms the group for each of the plurality of communication terminals 120, and determines the representative, which is capable of communicating with the management terminal 110, in each group. Accordingly, the number of times the communication terminals 120 request the management terminal 110 for authentication can be considerably decreased. Further, since the auxiliary management terminal 1310 preliminarily specifies the representative terminal MSTA and allocates the wireless channel, the number of packet collisions occurring at the time of forming the group is reduced and the time necessary for forming the group is decreased.

Further, the component described in the above embodiments may be realized as an LSI which is an integrated circuit. These components may be each provided as an individual chip, or a chip that includes a part or all of the components may be provided. Although LSI is mentioned above, the integrated circuit may be referred to as an IC, a system LSI, a super LSI, or an ultra LSI depending on the degree of integration. Further, the method of circuit integration is not limited to LSI, and may be realized as a dedicated circuit or a general purpose processor. Alternatively, an FPGA (Field Programmable Gate Array) which is programmable after LSI production, or a reconfigurable processor enabling reconfiguration of connection or setting of a circuit cell in an LSI may be used. Still alternatively, calculation performed by the functional blocks may be performed by using, for example, a DSP, a CPU, or the like. Further, the processing steps may be stored as a program on a storage medium, and may be performed through execution of the program.

Still further, in the case where another circuit integration technology replacing LSI becomes available due to an advance in the semiconductor technology or due to emergence of another technology derived therefrom, the function blocks may, of course, be integrated using such a technology. There is a possibility of application of biotechnology or the like.

INDUSTRIAL APPLICABILITY

The present invention is applicable to a wireless communication system or the like, which uses a sensor network or a wireless network containing a large number of terminals such as active RF tags and the like, and is particularly useful in a case, for example, where it is desired to perform authentication of more communication terminals even when, in particular, a large number of communication terminals pass a communication area of a management terminal in a short time.

REFERENCE SIGNS LIST 100, 1500 wireless communication system
110, 1510 management terminal
120, 1520 communication terminal
220 antenna
230 transmission/reception section
250 modulation section
260 demodulation section
270 control section
280 memory
301-306 channel bandwidth
401 preamble
402 PHY header
403 MAC header
404 payload 1310 auxiliary management terminal
101-104, 1302 period

The invention claimed is:

1. A wireless communication system comprising:
a plurality of communication terminals; and
a management terminal which manages the plurality of communication terminals,
wherein at least one communication terminal of the plurality of communication terminals includes:
a first transmission section for transmitting a first beacon;
a first reception section for receiving a response which is transmitted from another communication terminal having received the first beacon, the response including identification information;
a storage section, in which the other communication terminal is registered as a terminal which belongs to a group where the at least one communication terminal serves as a representative, for storing the identification information of the other communication terminal;
a second reception section for receiving a second beacon from the management terminal; and
a second transmission section for collectively transmitting together with a group authentication request which requests authentication of all of the communication terminals which belong to the group, to the management terminal in response to reception of the second beacon, identification information of the at least one communication terminal and the identification information of the other communication terminal, which is stored in the storage section, and
wherein the management terminal includes:
a transmission section for transmitting the second beacon;
a reception section for collectively receiving the identification information and the group authentication request from the at least one communication terminal which serves as the representative of the group; and
a control section for performing an authentication procedure for each of all of the communication terminals which form the group, in response to the reception of the group authentication request by using the identification information.

2. The wireless communication system according to claim 1, wherein the transmission section of the management terminal transmits the second beacon which includes information specifying a frequency channel used for a response.

3. The wireless communication system according to claim 2, wherein the control section of the management terminal performs the authentication procedure by using a frequency channel different from the frequency channel used for the response.

4. The wireless communication system according to claim 1, wherein the communication terminals which belong to the group transmit packets without preambles such that the packets are continuously transmitted following a response transmitted from the at least one communication terminal which serves as the representative of the group, so as to allow the response transmitted from the group to the management terminal to be recognized as one packet.

5. The wireless communication system according to claim 1, further comprising an auxiliary management terminal (i) for transmitting a third beacon to the plurality of communication terminals before the plurality of communication terminals forms the group, (ii) for receiving an authentication request transmitted from a communication terminal which has received the third beacon, and (ii) for assigning the communication terminal which has transmitted the authentication request, in response to the authentication request, as either (a) a communication terminal which serves as the representative of the group, or (b) a communication terminal which belongs to the group.

6. A communication terminal in a wireless communication system including a plurality of communication terminals and a management terminal which manages the plurality of communication terminals, the communication terminal comprising:
a first transmission section for transmitting a first beacon;
a first reception section for receiving a response which is transmitted from another communication terminal having received the first beacon, the response including identification information;
a storage section, in which the other communication terminal is registered as a terminal which belongs to a group where the communication terminal serves as a representative, for storing the identification information of the other communication terminal;
a second reception section for receiving a second beacon from the management terminal; and
a second transmission section for collectively transmitting, together with a group authentication request which requests authentication of all of the communication terminals which belong to the group, to the management terminal in response to reception of the second beacon, identification information of the communication terminal and the identification information of the other communication terminal, which is stored in the storage section.

7. A communication method performed in a wireless communication system including a plurality of communication terminals and a management terminal which manages the plurality of communication terminals, the method comprising:
transmitting and receiving a first beacon among the plurality of communication terminals;
assigning a communication terminal, which has transmitted the first beacon, as a representative terminal of a group, and a communication terminal, which has received the first beacon, as a belonging terminal of the group;
receiving, by the representative terminal, identification information from the belonging terminal and storing the identification information in the representative terminal;
collectively transmitting identification information together with a group authentication request which requests authentication of all of the communication terminals which belong to the group, from the representative terminal to the management terminal, in response to reception of a second beacon transmitted from the management terminal, the identification information being of the representative terminal and the belonging terminal; and
performing, by the management terminal, an authentication procedure, in response to reception of the group authentication request by using the identification information which is collectively received from the representative terminal, for each of all of the communication terminals that form the group.

8. An integrated circuit to be used in a communication terminal in a wireless communication system including a plurality of communication terminals and a management terminal which manages the plurality of communication terminals, the integrated circuit comprising:

a first transmission section for transmitting a first beacon;

a first reception section for receiving a response which is transmitted from another communication terminal having received the first beacon, the response including identification information;

a storage section, in which the other communication terminal is registered as a terminal which belongs to a group where the communication terminal serves as a representative, for storing identification information of the other communication terminal a second reception section for receiving a second beacon from the management terminal; and a second transmission section for collectively transmitting together with a group authentication request which requests authentication of all of the communication terminals which belong to the group, to the management terminal in response to reception of the second beacon, identification information of the communication terminal and the identification information of the other communication terminal, which is stored in the storage section.

* * * * *